US012625757B1

(12) United States Patent
Acevedo et al.

(10) Patent No.: US 12,625,757 B1
(45) Date of Patent: May 12, 2026

(54) SYSTEM AND METHOD FOR AUTOMATED SYSTEM BEHAVIOR PREDICTION AND FAULT MITIGATION

(71) Applicant: VEDO SYSTEMS, League City, TX (US)

(72) Inventors: Amanda Acevedo, League City, TX (US); Alex Clanton Stevens, Pearland, TX (US)

(73) Assignee: VEDO SYSTEMS, League City, TX (US)

(*) Notice: Subject to any disclaimer, the term of this patent is extended or adjusted under 35 U.S.C. 154(b) by 0 days.

(21) Appl. No.: 19/039,819

(22) Filed: Jan. 29, 2025

Related U.S. Application Data

(60) Provisional application No. 63/549,451, filed on Feb. 3, 2024.

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0721* (2013.01); *G06N 20/00* (2019.01)

(58) Field of Classification Search
CPC .............. G06F 11/079; G06F 11/0721; G06F 11/0793; G06N 20/00
See application file for complete search history.

(56) References Cited

U.S. PATENT DOCUMENTS

| | | | |
|---|---|---|---|
| 6,012,152 A | 1/2000 | Douik | |
| 7,237,138 B2 * | 6/2007 | Greenwald | ......... G06F 11/2257 |
| | | | 714/4.3 |
| 9,146,840 B2 * | 9/2015 | Alderman | ........... G06F 11/3668 |
| 10,922,210 B2 | 2/2021 | Richardson | |
| 10,984,338 B2 | 4/2021 | Morris, II | |
| 11,943,098 B2 * | 3/2024 | Tse | ...................... H04L 41/0233 |
| 12,314,385 B1 * | 5/2025 | Beauchesne | ........ H04L 63/1425 |

(Continued)

FOREIGN PATENT DOCUMENTS

WO      WO2023114121 A1     6/2023

OTHER PUBLICATIONS

Twaia, Bhekisipho; Predicting Software Faults in Large Space Systems using Machine Learning Techniques; Defence Science Journal; Aug. 2011; 306-316; v61(4); DOI 10.14429.

(Continued)

*Primary Examiner* — Jonathan D Gibson
(74) *Attorney, Agent, or Firm* — G. Michael Roebuck, PC

(57) ABSTRACT

A configurable, data-driven computer software program that predicts system behavior and detects anomalies within these behavior predictions. The software program is configured by a data set specified by the user or another computer program and utilizes system data provided by the user or the target system itself. The program predicts system behavior, estimates outlying predictions and then automatically labels the predictions and outliers. Once system predictions are labeled, the program uses outlier recognition to classify predictions as expected (nominal) or unexpected (anomalous) behavior. Users can configure the program to perform various tasks, such as testing other software programs for defects, as well as detecting and mitigating system errors/faults in real-time on target systems.

20 Claims, 35 Drawing Sheets

Lifecycle of a Whetstone model from testing to deployment.

(56)                References Cited

U.S. PATENT DOCUMENTS

| | | | |
|---|---|---|---|
| 2005/0102567 A1* | 5/2005 | McGuire | G06F 11/2257 |
| | | | 714/25 |
| 2006/0101402 A1 | 5/2006 | Miller | |
| 2007/0038899 A1* | 2/2007 | O'Brien | G06F 11/0709 |
| | | | 714/E11.023 |
| 2013/0232258 A1* | 9/2013 | Bullock | H04L 41/18 |
| | | | 709/224 |
| 2018/0268313 A1* | 9/2018 | Baxter | G06Q 10/0635 |
| 2020/0285997 A1 | 9/2020 | Bhattacharyya | |
| 2021/0089378 A1* | 3/2021 | Tigrek | G06F 11/0772 |
| 2021/0160124 A1* | 5/2021 | Yan | H04L 41/5009 |
| 2022/0351997 A1 | 11/2022 | Gwinn | |
| 2022/0383110 A1* | 12/2022 | Przystupa | G06N 3/08 |
| 2022/0407841 A1* | 12/2022 | Karpowicz | H04L 63/1458 |
| 2024/0119342 A1* | 4/2024 | Nixon | G06N 3/006 |
| 2024/0146747 A1* | 5/2024 | Zaytsev | H04L 63/1416 |
| 2024/0185122 A1* | 6/2024 | Lee | G06N 7/01 |
| 2024/0281359 A1* | 8/2024 | White | G06F 11/3409 |
| 2025/0103410 A1* | 3/2025 | Mohanty | G06F 11/302 |

OTHER PUBLICATIONS

Zehra, Sehar et al.; Machine Learning-Based Anomaly Detection in NFV: A Comprehensive Survey; MDPI; Jun. 5, 2023; V23(11); 5340; DOI: 10.3390/s23115340. link below.

* cited by examiner

Lifecycle of a Whetstone model from testing to deployment.

Example of how data is used for both training and predictions.

FIG. 3
Example of how patterns can be determined with only 25% valid truth.
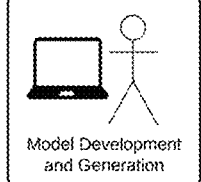
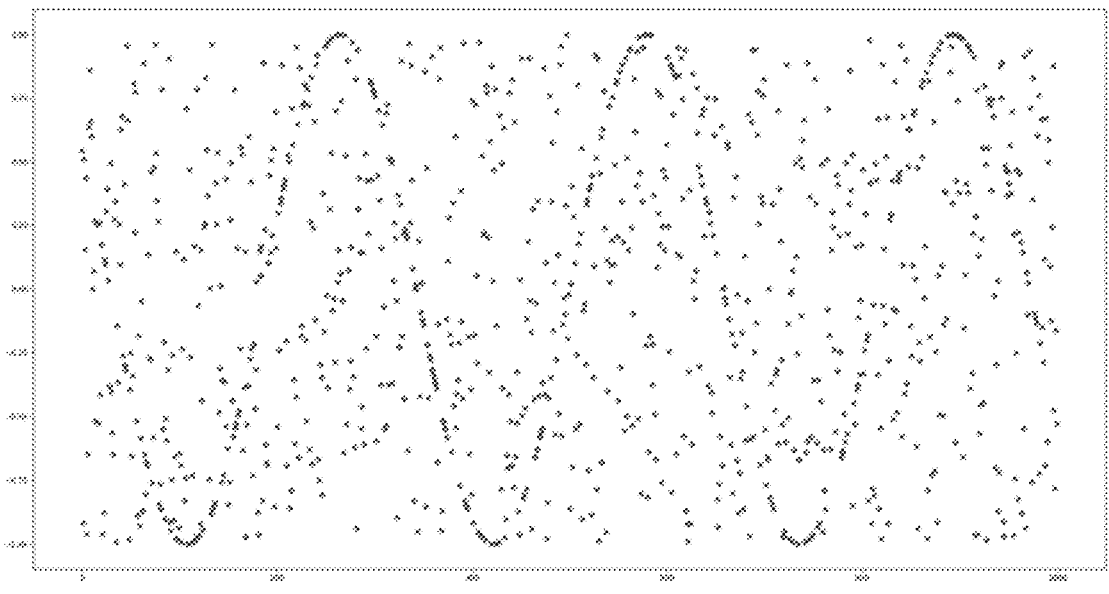

FIG. 4

Example of how user interface takes in data for generating AI models.

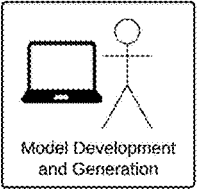

Model Development
and Generation

Create New Model Configuration

| Source Data Sets | |
|---|---|
| — Select All — | ▓ |
| nom_2015-08-01 | ▓ |
| nom_2015-08-02 | ▓ |
| nom_2015-08-03 | ▓ |
| nom_2015-08-04 | ▓ |
| 2016-08-02 | ▓ |
| 2016-08-03 | ▓ |

| Variables | Target | Input | Input Index ⓘ |
|---|---|---|---|
| — Select All — | ☐ | ☐ | |
| adcs_mo de (Mode) | ☐ | ☐ | |
| batt_cap acity (Amp hrs) | ☐ | ☐ | |

Select Source Data Set

Select Input and Target Variables Found in Selected Data Sets

FIG. 5
Example of how results are shown in the GUI.
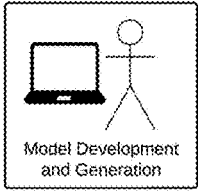
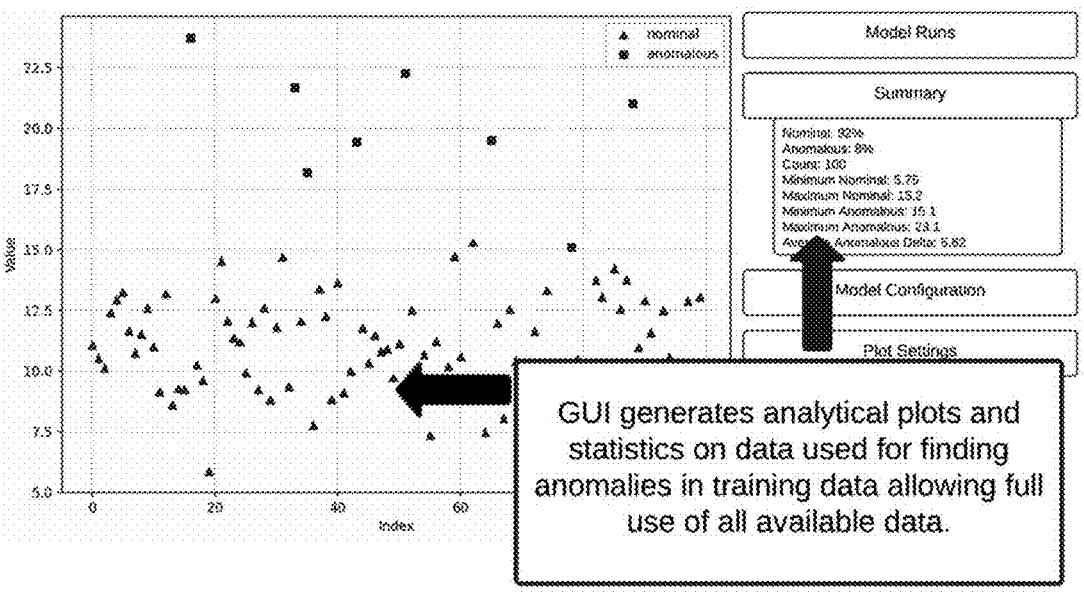

FIG. 6
Depiction of Whetstone model prediction and classification accuracy.
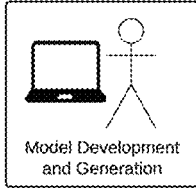
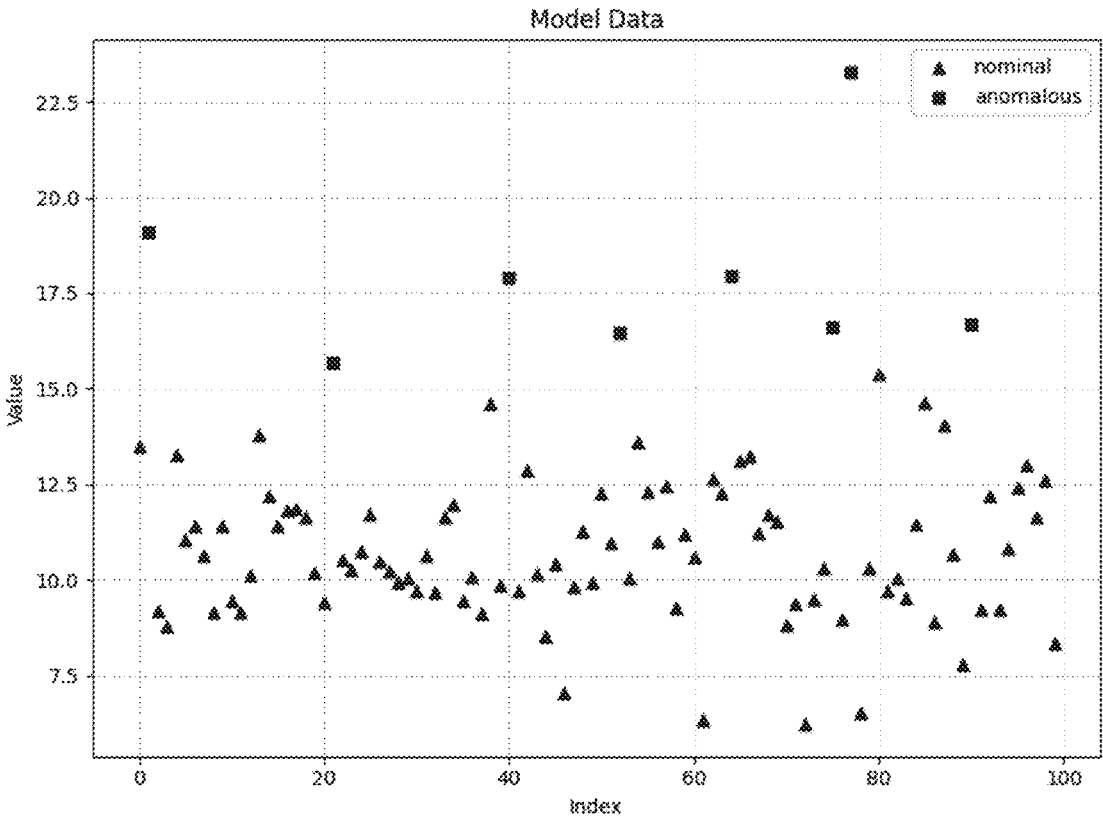

FIG. 7
Depiction of Whetstone model prediction and classification accuracy.
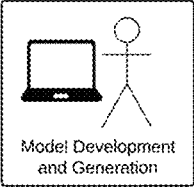
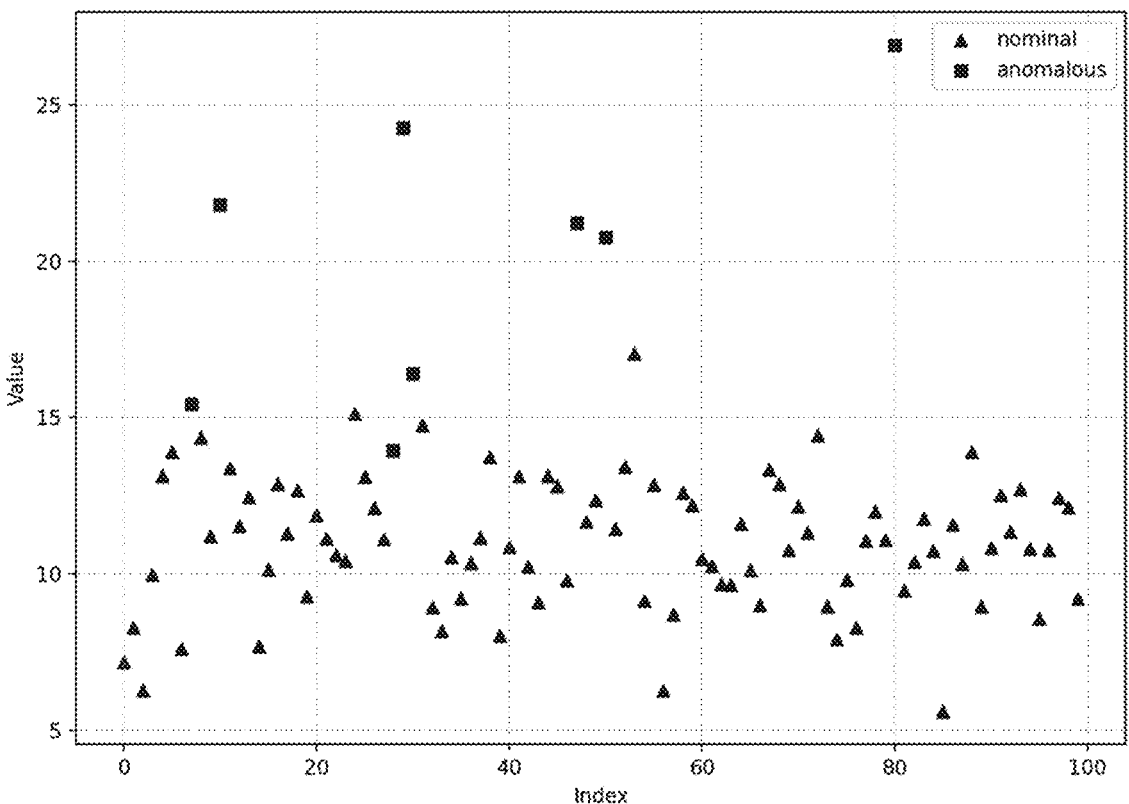

FIG. 8
*Model Generation, Testing, and Deployment*
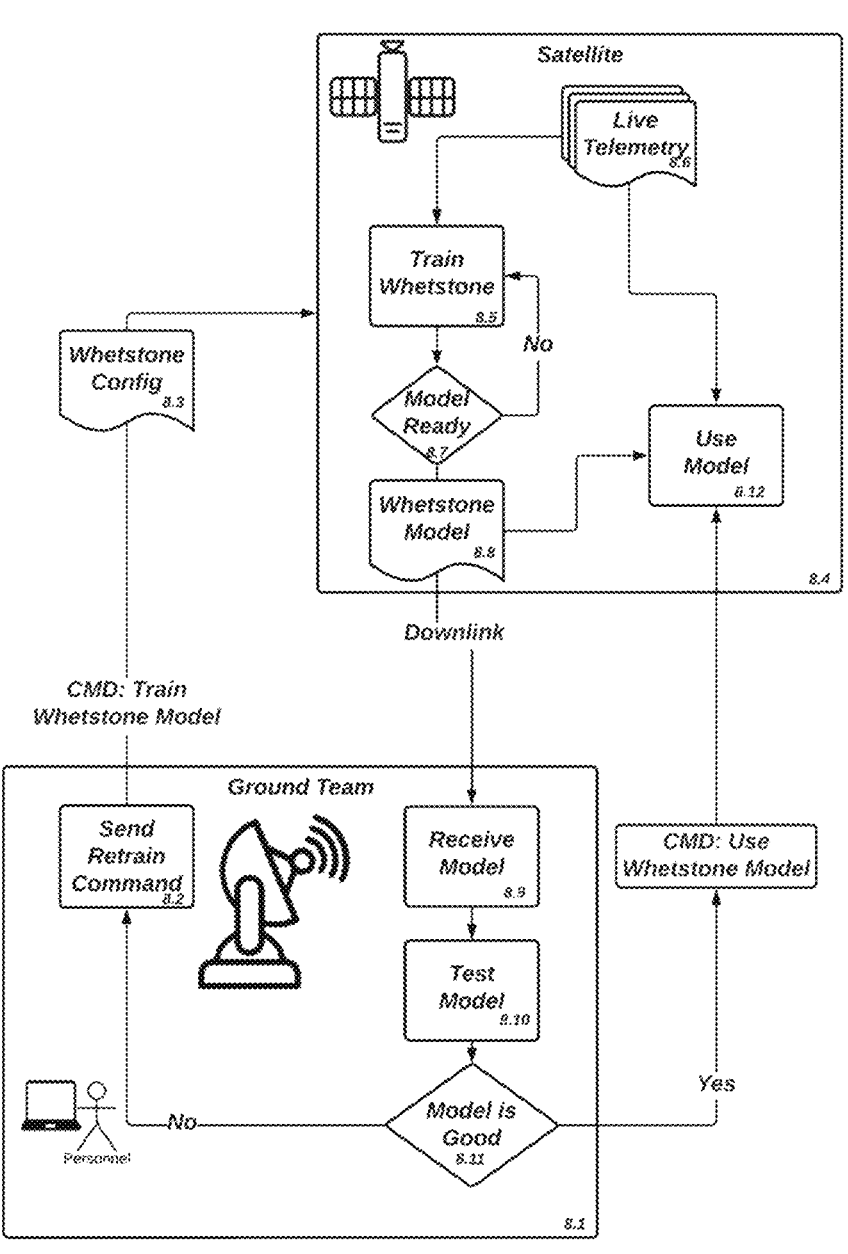

Diagram of how Whetstone finds anomalies in system test data.

FIG. 10
Diagram of neural networks used for prediction ML model.
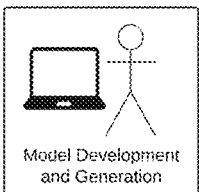
*N = Number of User Defined Inputs*
*X = Scaling Coefficient used in Conjuction with N*
*T = Number of User Defined Targets*
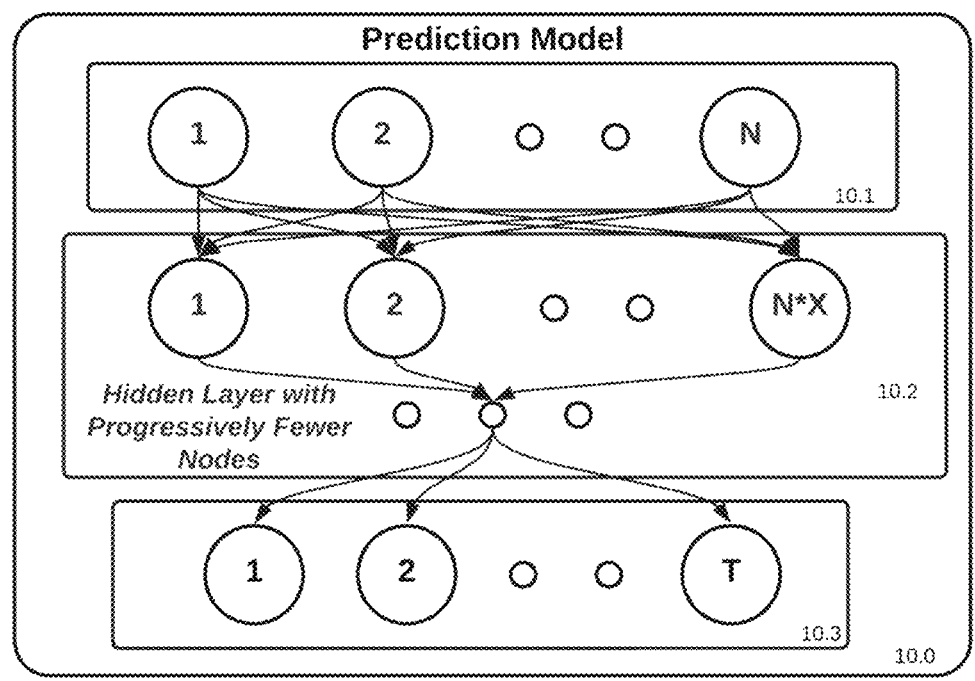

Diagram of how a single Whetstone model config can be used for two different versions of the system and allowing unique models for each version.

Demonstration of how multiple runs from a single system can be used to train and enhance a Whetstone model.

FIG. 13
Demonstration of how runs from both a simulated system and a real deployed
system can be used to train a Whetstone model.
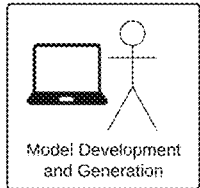
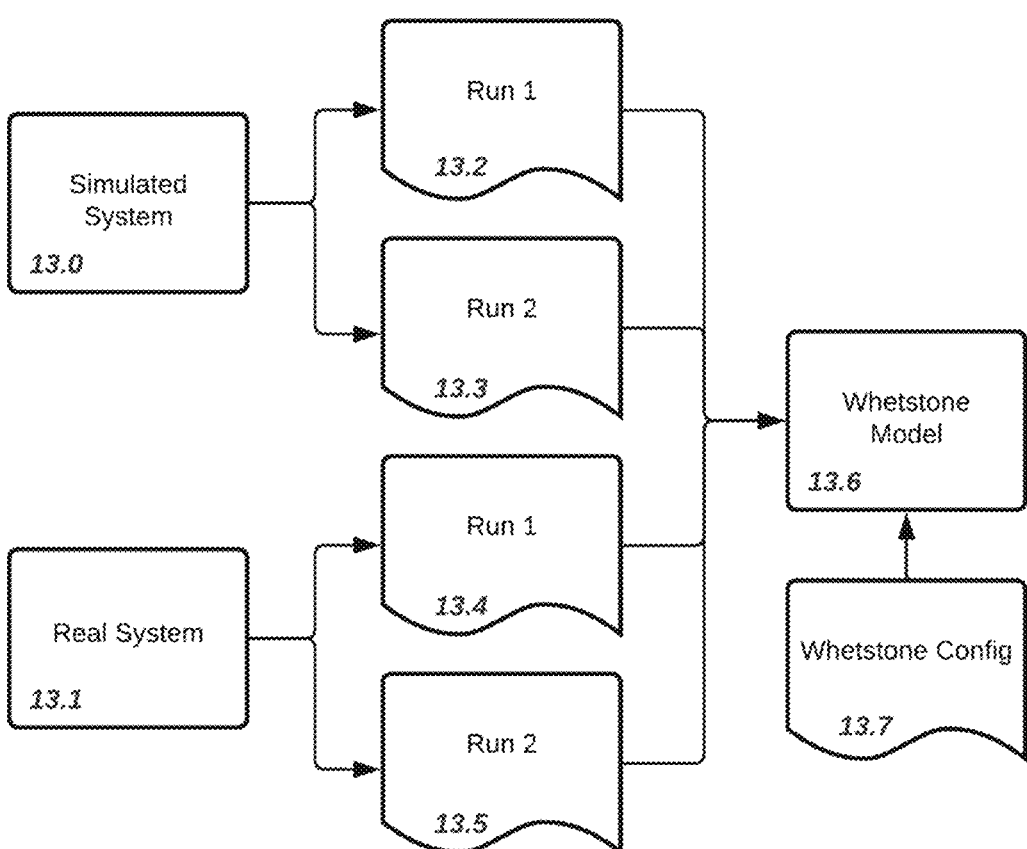

FIG. 14
Example of the data fed to the differential algorithm and how it is fed to the statistical algorithm and classifier model.
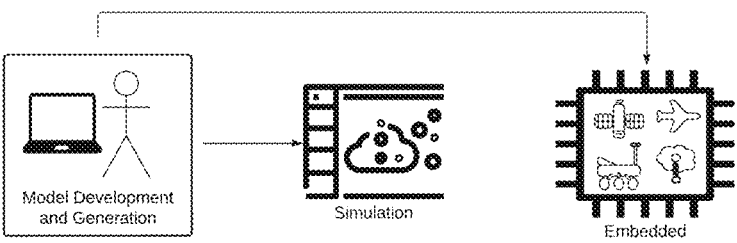
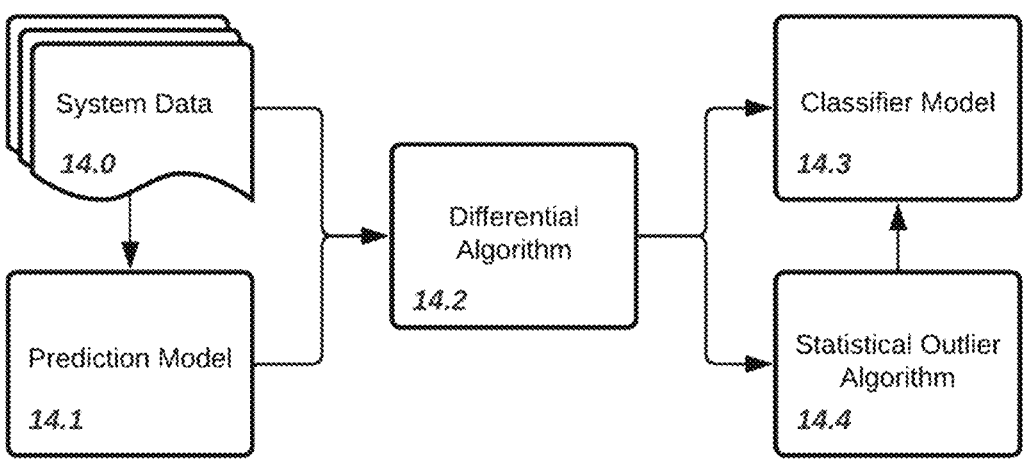

Data flow of the invention with example data structures.

FIG. 16
Traditional ML/AI model development lifecycle.
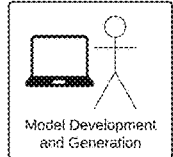
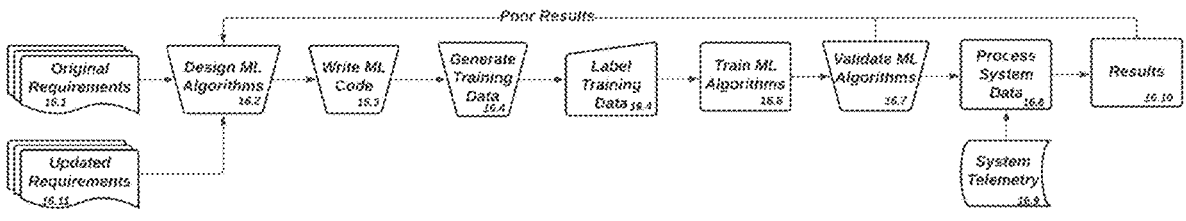

Development lifecycle of building AI models using the given invention.

Data flow for traditional ML/AI model training.

Data flow for present invention.

Lifecycle of traditional system testing.

FIG. 21
Lifecycle of testing with Whetstone, benefits of fault detection system with minimal additional human time.
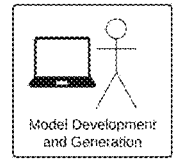
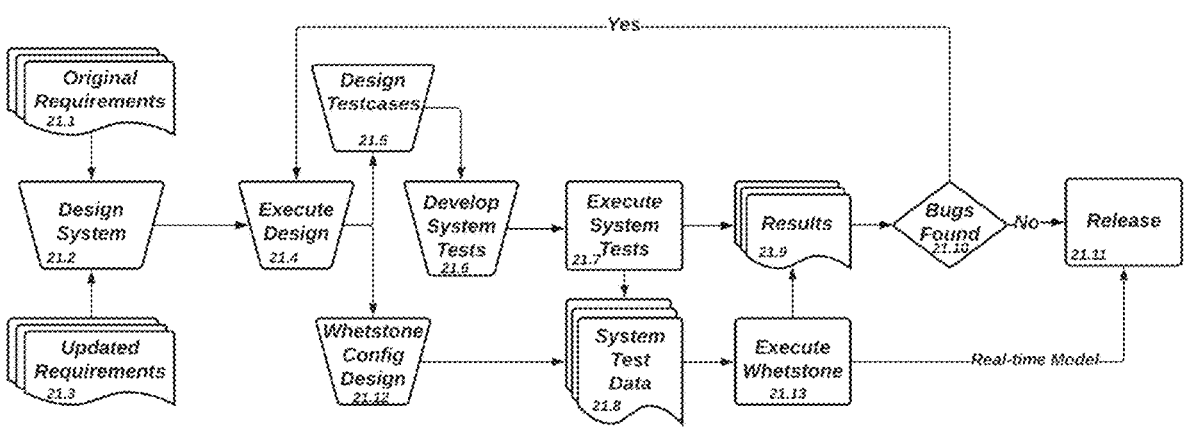

FIG. 22

Pseudo Code

FIG. 22.0
```
# Load system behavior data - training data
behavior_data = file.read("{from user provided data file for training/whetstone model generation}")
whetstone_model_config = file.read("{from user provided whetstone config}")
```

FIG. 22.1
```
# Create the prediction ML model neural network.
prediction_ml_model = new NeuralNetwork(
    input_layer_width=whetstone_config.inputs.length,
    hidden_layer_width=whetstone_config.inputs.length * whetstone_config.pred_scaler,
    hidden_layer_count=max(3, whetstone_config.pred_scaler),
    output_layer_width=whetstone_config.targets.length);
```

FIG. 22.2
```
# Train prediction model.
prediction_ml_model.train(data=behavior_data[whetstone_config.inputs],
                          validation=behavior_data[whetstone_config.targets]);
```

FIG. 22.3
```
# Load system behavior data - data to be processed by whetstone to generate predictions.
behavior_data = file.read("{from user provided data file whetstone will process for predictions}")
whetstone_model_config = file.read("{from user provided whetstone config}")
```

FIG. 22.4
```
# Generate behavior predictions.
behavior_predictions = prediction_ml_model.predict(behavior_data[whetstone_config.inputs]);
```

FIG. 22.5
```
# Get the difference between prediction and observed behavior.
diffs = absolute_values(behavior_predictions - behavior_data[whetstone_config.targets]);
```

FIG. 22.6
```
# Find statistical outliers.
scaled_diffs = calculate_scaled_differences(diffs, behavior_predictions);
median_diff = scaled_diffs.median();
outliers = {}; # List of indices of outliers from behavior_data.
top_median_sample_percent = 0.00; # Increment on each loop.
outlier_multiple = whetstone_config.outlier_multiple;
scaled_diffs = scaled_diffs.sort();
do
{
    if(top_median_sample_percent < 0.05)
        top_median_sample_percent += 0.01;
    else
        outlier_multiple -= 0.1;
        top_outliers_diffs = scaled_diffs[1.0-top_median_sample_percent:];
        outliers = top_outliers_diffs[top_outliers > outlier_multiple * median_diff].indexes();
}
while(outliers.length() == 0 and outlier_multiple >= 1.0);

# If no outlier is found, choose the index with the worst difference from the pool.
if(outliers.length() == 0)
{
    outliers = scaled_diffs[-1].index();
}
```

FIG. 22.7
```
# Create the classifier model.
classifier_ml_model = new NeuralNetwork(
    input_layer_width=whetstone_model_config.targets.length,
    hidden_layer_width=whetstone_model_config.targets.length
        * whetstone_config.inputs.length
        * whetstone_config.detect_scaler,
    output_layer_width=2);
```

FIG. 22.8
```
# Auto-label Data for Classifier model
nominal_indices = behavior_data not in outliers
anomalous_indices = outliers;
auto_labeled_data["nominal"] = (behavior_data.targets[nominal_indices],
                                behavior_predictions[nominal_indices]);
auto_labeled_data["anomalous"] = (behavior_data.targets[anomalous_indices],
                                  behavior_predictions[anomalous_indices]);
```

FIG. 22.9
```
# Train classifier model
classifier_training_data = (behavior_data[whetstone_config.targets],
                            behavior_predictions);
classifier_ml_model.train(data=classifier_training_data,
                          validation=auto_labeled_data);
```

FIG. 22.10
```
# Generate classification predictions.
classifier_predictions = classifier_ml_model.predict(classifier_training_data);
```

FIG. 22.11
```
# Output predictions
return(WhetstoneOutput(behavior_predictions, classifier_predictions));
```

FIG. 23

Data Structures

FIG. 23.0
```
union TelemetryValue
{
    bool bval;
    int ival;
    float fval;
};
```

FIG. 23.1
```
union Timestamp
{
    dateme dt;
    int seconds;
};
```

FIG. 23.2
```
struct BehaviorFrame
{
    // Unique me for this system run.
    Timestamp mestamp;
    // Diconary of telemetry variables with a given value (bool, int, float
are all acceptable).
    dict<str, TelemetryValue> telemetry;
};
```

FIG. 23.3
```
struct BehaviorData
{
    list<BehaviorFrame> frames;
};
```

FIG. 23.4
```
struct WhetstoneConfig
{
    str name;
    list<str> targets;
    list<str> inputs;
    float pred_scaler; // Used for tuning the accuracy of the predion ML
algo.
    float outlier_mulple; // Used for tuning the sensivity of the outlier
algorithm.
    float detect_scaler; // Used for tuning the accuracy of the classifier
ML algo.
};
```

FIG. 23.5
```
struct WhetstonePredictFrame
{
    Timestamp mestamp;
    // Diconary of telemetry prediciton value with the target variable name
that is being predicted..
    dict<str, TelemetryValue> targetPredicons;
    float nominal_confidence; // 0.0-1.0 level of confidence.
    float anomalous_confidence; // 0.0-1.0 level of confidence.
};
```

FIG. 23.6
```
struct WhetstoneOutput
{
    list<WhetstonePredictFrame> frames;
};
```

FIG. 24
Example of using the present invention's capabilities for automatically testing systems with feedback system for manually correcting the model.
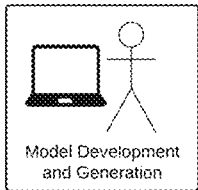
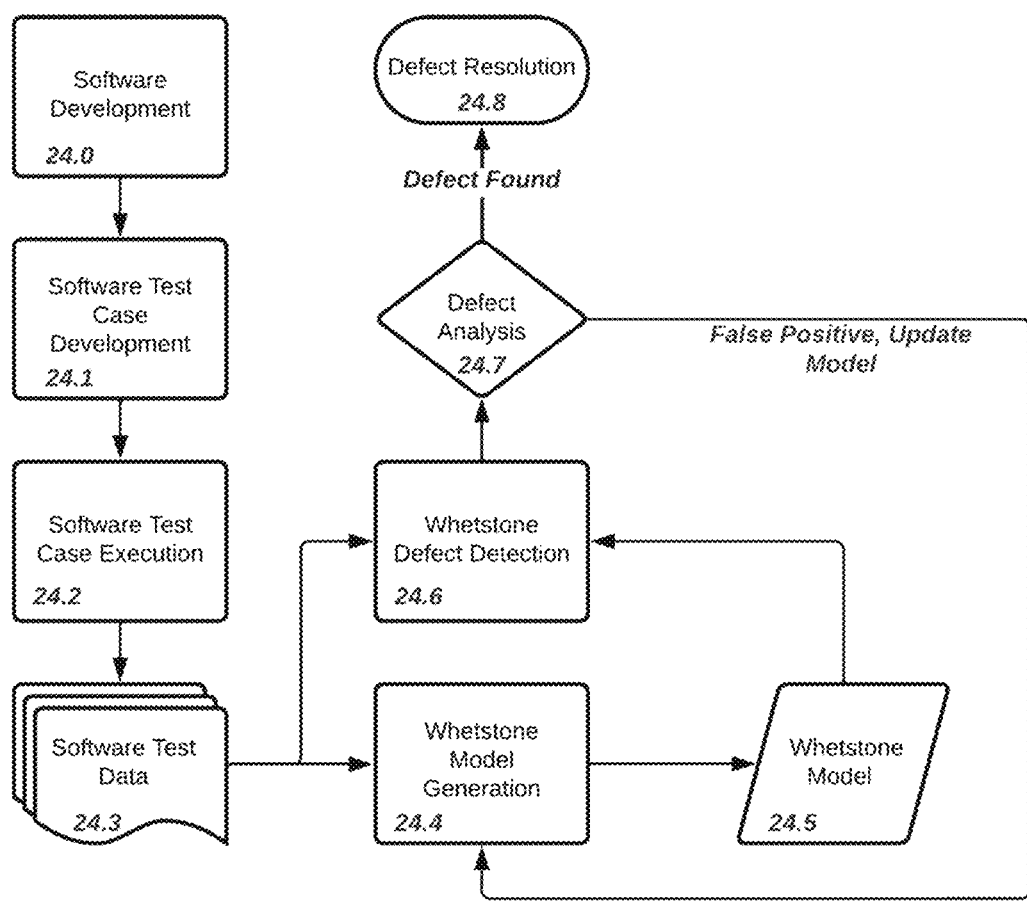

FIG. 25
Demonstration of continually training a model in a deployed state.
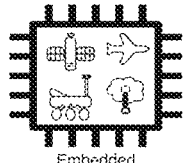
Embedded
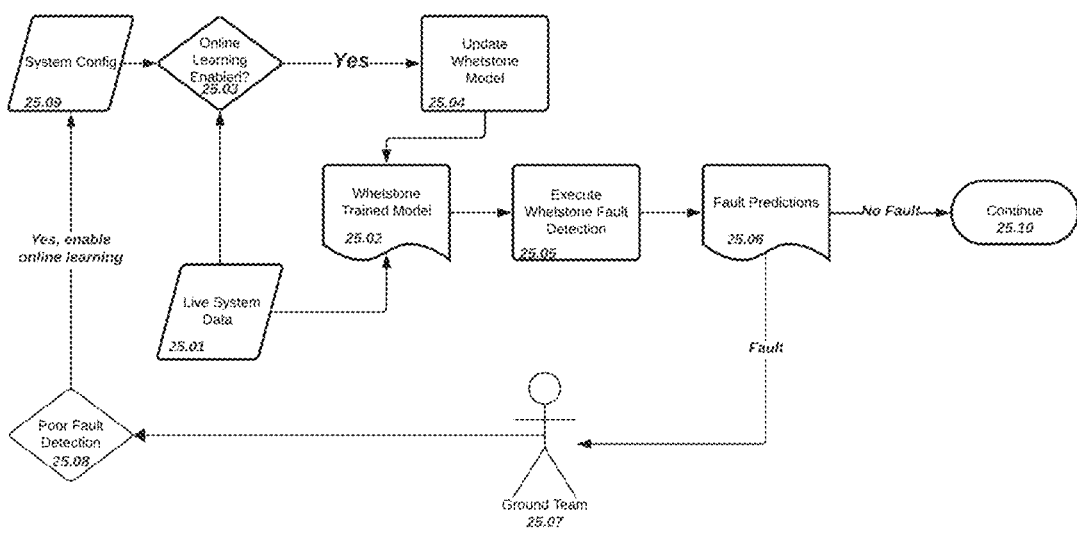

FIG. 26
GUI interface for configuring the invention's generated model.
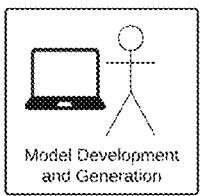
Model Development and Generation
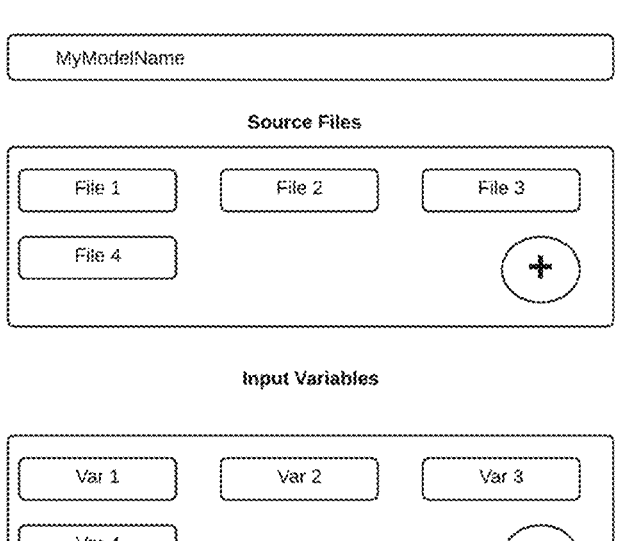
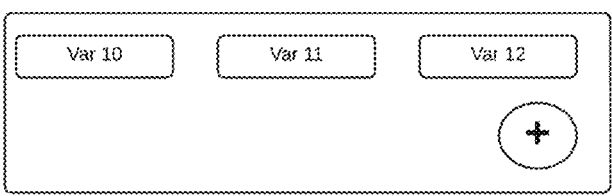

Whetstone Prediction Model and Inverted Prediction Model

FIG. 28
Fault Resolution Order of Operations
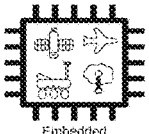
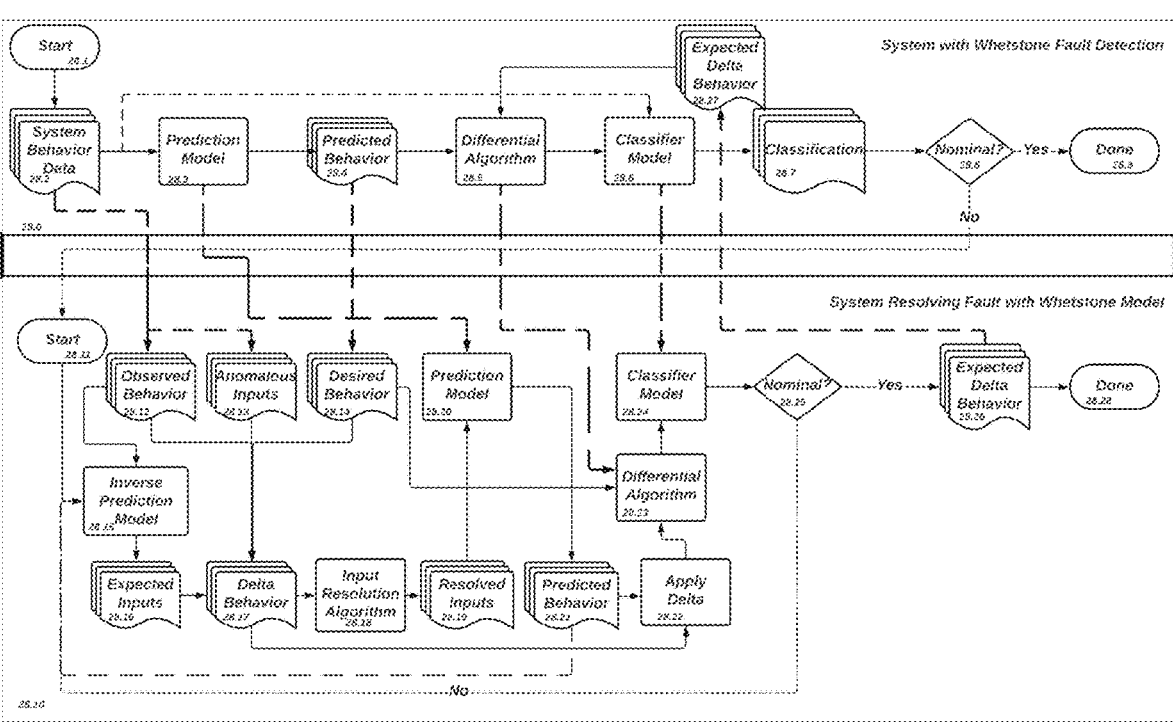

FIG. 29
Fault Resolution Iterative Refinement
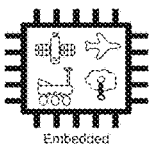
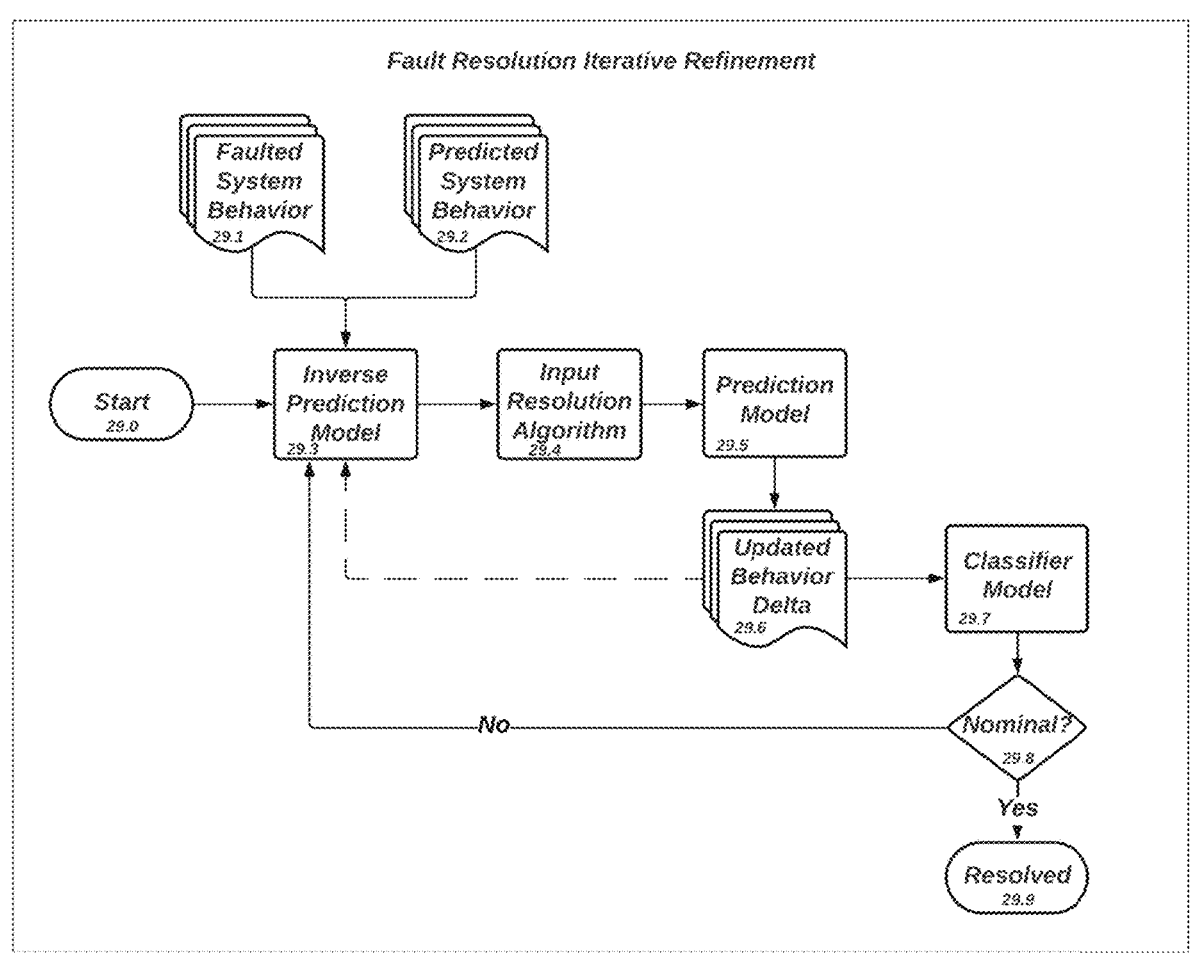

FIG. 30
Example: Satellite Thruster Fault Resolution Steps
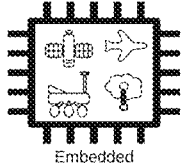
Embedded
*Example: Thruster Failure Fault Resolution*
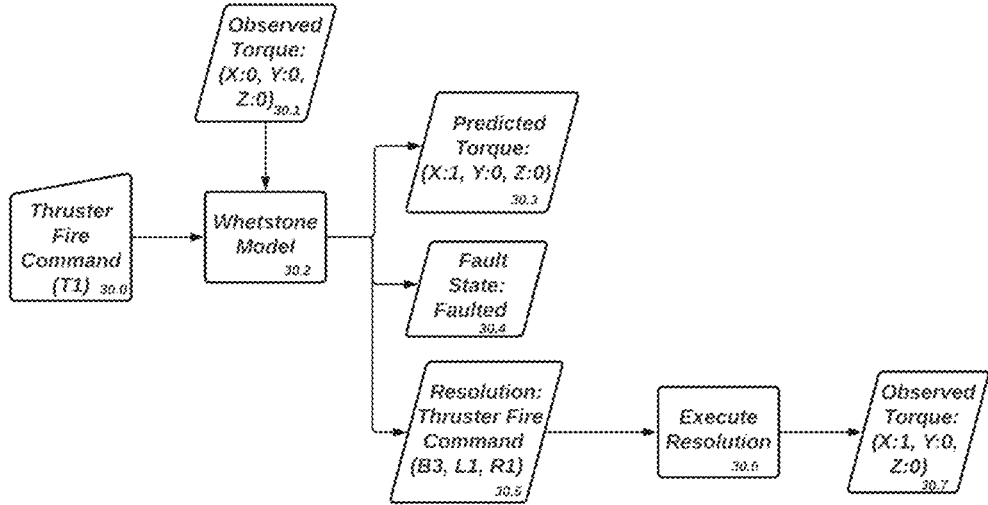

FIG. 31
Example: Model Generation, Testing, Simulation, Deployment, and Execution
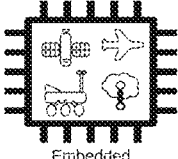
Embedded
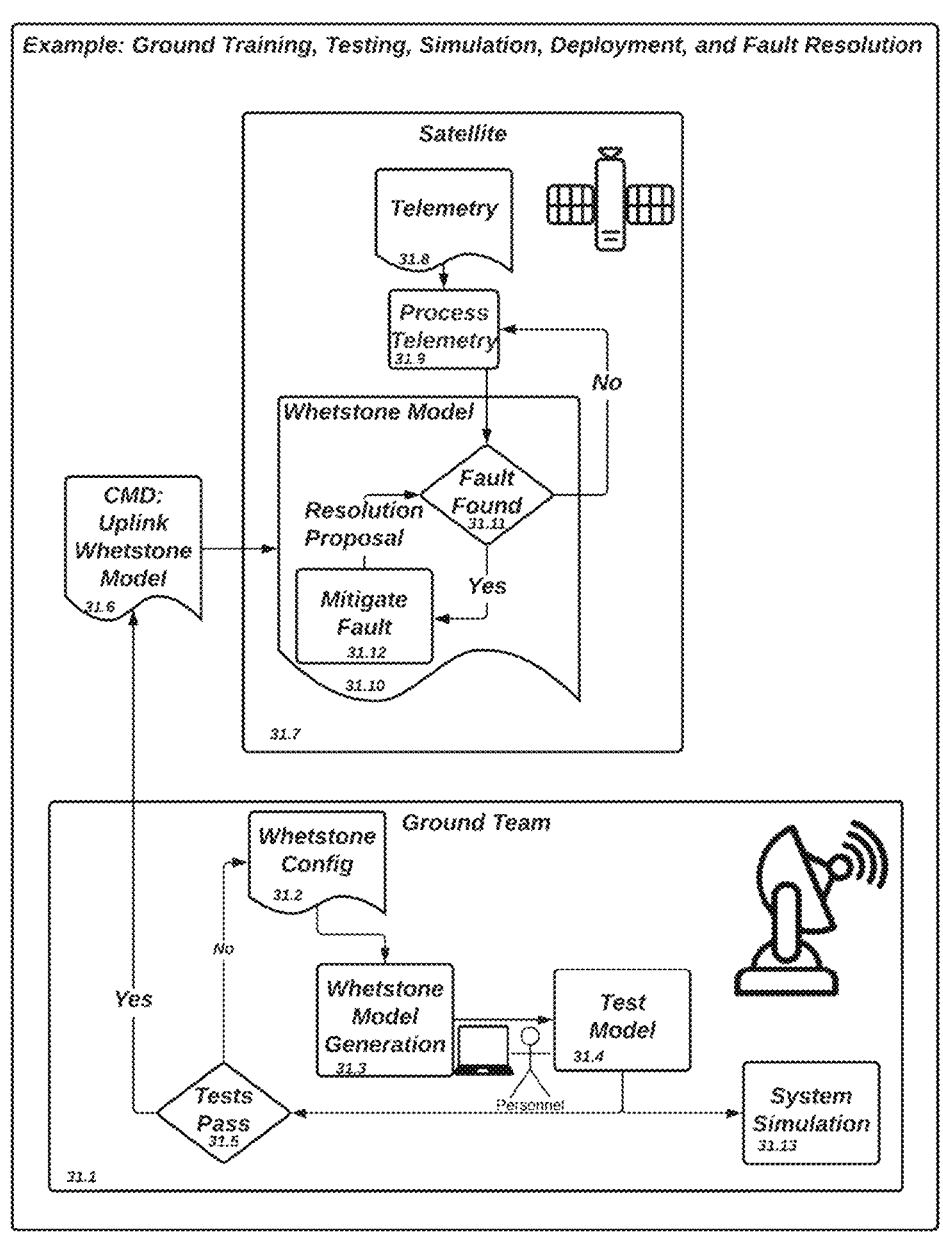

Current State of Art Anomaly Classification

32.0

Whetstone Anomaly Classification Methods

33.0

Whetstone Dataflow for Simulation

FIG. 35
*Whetstone for System Component Simulation*
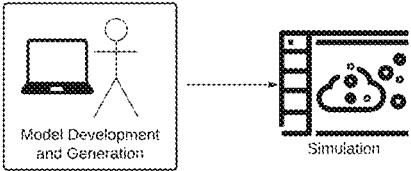
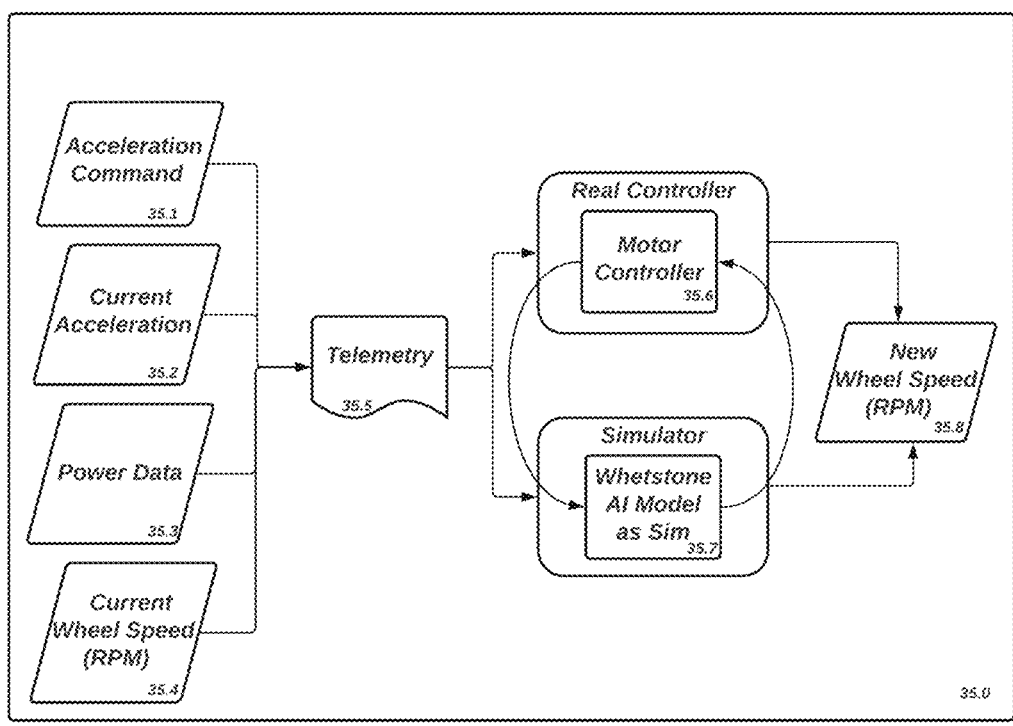

SYSTEM AND METHOD FOR AUTOMATED SYSTEM BEHAVIOR PREDICTION AND FAULT MITIGATION

CROSS REFERENCE TO RELATED APPLICATIONS

This patent application claims priority to provisional patent application entitled A SYSTEM AND METHOD FOR AUTOMATED SYSTEM BEHAVIOR PREDICTION AND FAULT MITIGATION by Acevedo filed on Feb. 3, 2024, and assigned Ser. No. 63/549,451, which is hereby incorporated by reference in it's entirety.

The present invention relates to the fields of system behavior prediction (including off-nominal behaviors) and system recovery upon detection of faulted system behavior. The term 'anomalies' are used throughout to indicate off-nominal behavior and 'faults' are used to indicate anomalies that resulted in the failure of a running system in some way either by degraded system performance or potential total failure of a given system.

BACKGROUND OF THE INVENTION

As software systems have evolved due to increased autonomy and the integration of AI and ML, system developers and operators rely more and more on various systems and methods to predict system behaviors and manage system faults. Predictions of nominal behavior and detection of erroneous/faulty behavior are used during the different phases of system development to ensure the successful creation and operation of products. Detection of and responses to system faults during operations are critical to addressing issues that can impact human safety and the achievement of operational objectives, as well as the financial wellbeing of all involved. Outdated systems and methods from the prior art lead to high cost and time impacts of developing and using these systems and methods, negating potential benefits of the technologies involved.

Outdated Systems and Methods

Although software systems have become more complex, the systems and methods used to predict system behaviors and manage system faults have not evolved in-kind. Many of these solutions apply antiquated approaches that do not benefit from advancements in technology, including but not limited to AI and ML.

Traditional System Behavior and/or Fault Detection (Non-AI, General Capability)

Using the aerospace industry as an example, prediction of system behavior is "baked" into system design in most cases. Developers commonly use various analyses and assumptions to identify anticipated system behavior for standard and extreme operational scenarios. Once they are confident, they have identified the system's performance envelope, they will develop a system that fits within these bounds. The resulting system is limited in its adaptability, resulting in substantial rework as designs evolve and operational capabilities change. New systems that operate similarly to others in similar environments typically require significant updates to existing systems and methods for prediction and fault management, or the development of new ones altogether. Developers and operators will also use tools built with models that predict system behavior for various tasks, such as system testing and monitoring, as well as operator training. These models often duplicate those created for the target system, increasing cost and maintenance across platforms. Significant benefit is provided by systems and methods that can generically predict behavior for any system without requiring a priori knowledge of system performance capabilities. There is also a significant benefit provided by systems and methods that can be used on multiple platforms for system development and operation.

Traditional AI Fault Detection (General Capability)

Additionally, methods in these areas that do utilize Artificial Intelligence (AI) and Machine Learning (ML) rely on outdated AI and ML approaches. For example, FIG. 16 illustrates a typical work flow for traditional ML fault detection models. This workflow results in a unique fault detection application that is specific to the target system. After product requirements are defined and the ML software is designed, software engineers begin writing ML code for the prediction model. This effort includes coding the shape, size, and complexity of the traditional prediction model, wherein the traditional ML prediction model is a neural network. A shape for the neural network, chosen by software engineers, is typically customized for each target system to ensure accuracy of the generated prediction values. The largest drawbacks to this workflow are the significant effort required to develop custom code and the subsequent limitations to code reuse.

Another drawback to traditional ML fault detection models is the requirement for vast quantities of data to train and validate them. FIG. 18 illustrates a typical data flow employed in ML model training. Training data are generated by applying sample system operation data or by generating simulated system data. Generating these data is time consuming, generally requiring multiple passes to ensure sufficient data have been provided and used for training the ML model. Furthermore, labeling of data usually requires manual input from developers on what data values were anomalous or nominal. Adding this on top of the requirement for generating training data results in a considerable time investment. Once the data are generated, they are split into a training data set and a validation (or test) data set. This is usually an 80/20 split where the training set is used for training the ML algorithm and the validation set is used to validate the performance of the ML model. Once a model has been trained, real-time system data will be fed into the model where predictions on nominal vs anomalous status are generated. The generated results are typically the confidence levels of nominal vs anomalous predictions, which essentially provide a binary result that gives little insight into how the algorithm is making decisions.

High Development Costs (Focuses on Specific Applications of General Capability)

While the issues noted above highlight limitations due to lack of innovation, further issues arise from current applications of these systems and methods in industry. Current practices result in substantial costs and time delays pertaining to system development and operation. As mentioned above, solutions for system behavior prediction are typically custom-built for a specific operational range and only apply to the specific products under development/operations. In many cases, this inefficiency is made worse with multiple custom-built approaches being developed for the different phases of a specific system's development. When these systems and methods are utilized to perform critical tasks, such as software system testing and fault management, the approaches usually incur significant overhead and roadblocks to timely progress. Couple these factors with different companies protecting their intellectual property (IP) in their implementations of these systems and methods and the "wheel" is reinvented more often than necessary.

Traditional System Test Work Flow

As systems have evolved to incorporate more automation, testing during design and development is imperative to ensure the resulting system operates as required. Testing of safety-critical systems is a large undertaking, due in no small part to the critical nature of the system and low tolerance for failure. FIG. 20 illustrates a typical traditional system test work flow. Traditional testing is limited by the ability to manually cover as many permutations as possible (e.g., test coverage) and by the hardware resources available (e.g., test platforms and computational processing). Ensuring test coverage is sufficient and finding system defects early in the design process are key to confirming system quality and that operational requirements are met. Multiple layers of testing are employed to ensure effective and complete test coverage of a target system. However, it is not a simple task to ensure tests fully covering a target system design will cover the entire operational envelope. As mentioned above, system design usually employs an understanding of system performance expectations. Testing employs this approach as well, often leveraging every potential performance edge case. The inventors are aware of no prior way to directly test the completeness of a traditional test campaign. At best, to ensure a test campaign provides sufficient coverage, companies usually lean on expensive and slow third-party auditing teams to execute black box testing to ensure their results match those of the test campaign. Because testing is typically focused towards the middle and end of project lifecycles, it is usually constrained with respect to budget and schedule. This often results in limited test coverage and introduces risk where there are gaps in test coverage.

The testbeds used to conduct various system tests must be considered in the overall testing strategy, as their availability can impact schedule and budget. As software systems approach an operational pedigree, tests are conducted in higher fidelity testbeds with tests on the actual target system prior to standard operation being the most desired scenario. Testing on these testbeds is essential since they instill confidence that the system will operate as required in a representative target system environment. Although higher fidelity testbeds provide more representative system behavior, they are also very expensive to build and maintain. Testing on the actual target system adds the risk of damaging or even destroying the target system, making these types of tests the most expensive and restrictive in terms of access. These factors result in only a few high-fidelity testbeds available for testing that must be shared by various system developers and operators. The impacts to system developers are the level of preparation needed and the additional peers required for each round of testing. Preparation becomes more meticulous because of the limited availability of high-fidelity testbeds. Since testbeds may be scheduled far in advance, tests must be identified, developed, and scrutinized so that time and money are not wasted. Most test efforts incorporate multiple peer reviews to ensure proper test development and coverage. In addition, these reviews are also conducted to review test results and to address defects and other issues encountered during testing.

To help mitigate the risks of limited testing on testbeds and the target system, system developers rely heavily on simulation testing to reduce reliance on resource-constrained testbeds. Simulations are created that include simulated and actual target system components, as well as simulations of the operational environment. For certain industries, such as aerospace, there are instances where tests cannot be performed on operational target systems at any stage of development. A spacecraft's initial operation will most likely be in space, where its software systems must already be fully operational with as few defects as possible. In most cases, testing of a spacecraft's flight software system is conducted entirely prior to flight, and is necessary to provide a way to test the target systems without risk to flight hardware or human safety. Because simulations are critical to system testing for these scenarios, cost and development time are increased further. Alternately, lower budget developments may not have the resources required to model an entire target system in a simulator, thus reserving testing to resource-constrained testbeds and the target system itself. These factors could cause these types of development programs to incur costs that severely impact their development budget.

Traditional System Fault Management Work Flow

System fault management—composed of fault detection, isolation of fault root causes and recovery actions due to faults—is an important component of many current automated systems. General capabilities related to fault management have been discussed above. The following discussion focuses on the development of fault management systems and their integration onto operational target systems. Due to the real-time nature of most critical systems and edge computing capability typically used, high performance is necessary for fault management. Similar to the systems and methods described above, fault management systems are typically custom-built solutions that incur significant costs and development time. Software is developed manually to handle each fault case and subsequent mitigation action and is limited to a-priori knowledge of possible faults, resulting in a finite number of allowed failures before the system is unrecoverable. Another issue that impacts cost, development time and effectiveness of fault management is the start of its development during the development lifecycle. Typically, development to support fault management in a system begins after the core features of the system hardware and software have been procured, or even worse, they have already been implemented. This makes timely completion of fault management features challenging, resulting in higher project risk due to the serial nature of development. In order to cover every potential edge case, developers typically have to develop complex sets of test scenarios in a best-effort to prevent system faults from occurring during operations. This is both tedious and error prone, resulting in exponentially longer testing and higher risk for faults in more complex systems. ML and AI have been applied to these areas; however the costs are great. ML applications have traditionally been customized specifically for a system or system component requiring specialized engineers, special creation of labeled data and large quantities of computing resources.

Exclusive Development

There is a critical relationship between system behavior and fault management. Each element of fault management relies on knowledge of system behaviors in order to perform their respective functions. The process of fault detection consistently monitors system behavior to identify fault conditions requiring intervention. This part of fault management indicates that one or more faults have been detected when monitored system behavior exceeds certain behavior thresholds. Once faults have been detected, fault isolation identifies the root causes of adverse system behaviors. After the root causes of faults have been determined, fault recovery takes appropriate actions to mitigate the effects of these faults. Embedded in the preceding discussion is the fact that predictions of system behavior are needed to define the nominal and anomalous behaviors utilized by fault management.

It would seem that the tight coupling between system behavior prediction and fault management makes it advantageous for their developments to occur simultaneously by the same system developers. However, it is common practice for these components to be developed at different times during the development lifecycle. A traditional approach is for system designers to first address system development for nominal operations. The analyses and assumptions used to predict system behavior (as discussed above) are restricted to reasonable operational ranges driven by the nominal performance envelope. System faults are usually not considered at this stage of development because a certain level of system maturity is required before fault conditions are explored. Otherwise, there could be significant wasted effort and rework in fault management design as the associated systems continue to evolve during the development lifecycle. Once fault management development becomes a focus, further restrictions are placed to limit the faults addressed by the system to those that are most likely to occur and/or adversely impact operations. These factors typically result in separate developers, and sometimes even separate companies, developing system behavior predictions and a limited fault management capability, respectively. Steps to ensure proper coordination between these different entities entail significant overhead. Additionally, a disadvantage of this approach is that opportunities for more efficient development are missed. One example includes the usage of common components that could be utilized for system behavior prediction and fault management. These could leverage software engineering paradigms to make efficient and extensible code that can be reused throughout associated systems. Another example is the risk of needing to change already-designed system components if fault management development uncovers an issue that was not previously addressed when nominal operations were the focus. Development in this manner increases the risk of redundant efforts and throw-away work.

FIELD OF THE INVENTION

The present invention relates to the fields of system behavior prediction (including off-nominal behaviors) and system recovery upon detection of faulted system behavior via automated generation of AI models.

SUMMARY OF THE INVENTION

The present invention overcomes the outdated systems and methods that result in high development costs and limited capabilities. By performing ML model training in an automated and unsupervised manner and removing the need to generate large data sets specifically created for ML model training, the present invention offers significant gains in efficiency.

BRIEF DESCRIPTION OF THE DRAWINGS

FIG. 3 is a depiction of a particular illustrative embodiment of the invention, wherein the invention shows a plot with a 75% error rate and a signal is still recognized similar to how the invention is able to detect software defects or system faults though it is trained on imperfect data;

FIG. 4 shows the present invention will load data into the analytical tools, allowing developers to select input and target variables;

FIG. 5 depicts a particular illustrative embodiment of the invention that provides analytical models that generate analytical data that developers use to improve fault detection and find bugs in software;

FIG. 6 and FIG. 7 depict the accuracy of a particular illustrative embodiment of the present invention's prediction capabilities.

FIG. 8 depicts a Whetstone model lifecycle where a model is generated on a target system with live telemetry, then tested on ground, and a usage/deployment decision is made based on the testing of that model.

FIG. 10 is a depiction of a particular illustrative embodiment of the invention showing a prediction model shape;

FIG. 13 is a depiction of a particular illustrative embodiment of the invention, when using the prediction model of the present invention as a fault detection system, the same prediction model software module trained by the testing tool is used on the system to detect real time data value faults.

FIG. 14 is a depiction of a particular illustrative embodiment of the invention, a differential software module is used to compare differences between the prediction software module's output data values and actual target system behavioral data values to determine a level of error of the prediction software module;

FIG. 16 is a depiction of a traditional or prior art ML fault detection work flow is depicted;

FIG. 21 is a depiction of a work flow in a particular illustrative embodiment of the invention, wherein the work flow is different than the traditional work flow discussed above with respect to FIG. 20;

FIG. 22 depicts pseudo code for a computer program stored in a non-transitory computer readable medium that is used by a processor in a particular illustrative embodiment of the invention for training and application of the present invention's models;

FIG. 23 depicts pseudo code for generating the data structures stored in a non-transitory computer readable medium that is used by a processor to perform fault detection in a particular illustrative embodiment of the invention;

FIG. 24 is a depiction of a particular illustrative embodiment of the invention, for performing automated software test;

FIG. 25, is a depiction of a particular illustrative embodiment of the invention showing Automated Fault Detection for Software and on target incremental training of the fault detection AI model;

FIG. 26 is a depiction of a graphical user interface for a particular illustrative embodiment of the invention;

FIG. 28 is a depiction of the full order of operations from initial system observed behavior, to fault detection, through fault identification and resolution;

FIG. 29 is a depiction of how the fault resolution can be refined over multiple passes, ensuring that the resolution will no longer cause the classifier to flag faulted states;

FIG. 30 is a depiction of an example in which a satellite has a faulted thruster and how the present invention can produce a resolution command in which the behavior will provide the desired behavior;

FIG. 31 is a depiction of an example in which a Whetstone model is generated by ground teams, deployed on a target satellite system and executed on the satellite system. During execution of the satellite system, the satellite telemetry is passed into the Whetstone model which determines if a fault has occurred. If a fault is detected, the model generates a mitigation solution;

FIG. 35 depicts a particular illustrative embodiment of the invention wherein an AI model representing a system component is used as a simulation component (FIG. 35.7) to represent the physical component (FIG. 35.6) and can be used interchangeably with the real component.

DETAILED DESCRIPTION OF THE INVENTION

Figure 1:
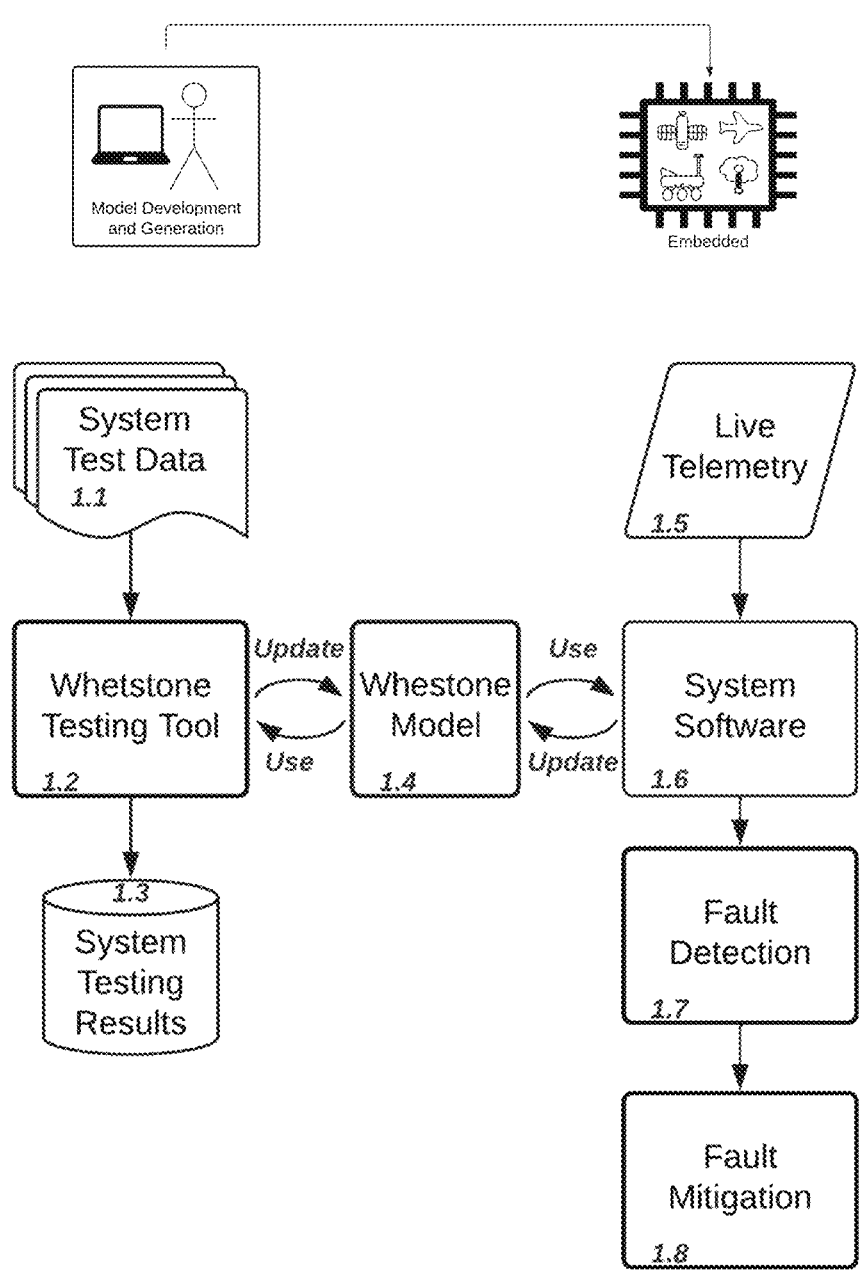
FIG. 1 is a depiction of a particular illustrative embodiment of the invention, wherein trained models are then utilized by the invention taking advantage of the model's trained prediction capabilities to detect software defects, or transferred to a target system, taking advantage of the model's trained prediction capabilities to automatically detect both system software defects and system faults.

In the following description, and for the purposes of explanation, numerous specific details and various embodiments of the disclosure are set forth, examples of which are illustrated in the accompanying drawings. While the disclosure will be described in conjunction with the following preferred embodiments, it will be understood that the descriptions are not intended to limit the disclosure to these embodiments. It should be noted that there are many different and alternative configurations, devices, and technologies to which the disclosed invention may be applied. The full scope of the invention is not limited to any examples or embodiments that are described below nor should any examples or embodiments be construed in any way as limiting the applications of the invention or the intention of the inventor in having the invention applied to any devices or systems whether presently existent or not. Furthermore, it will be understood by those skilled in the art that variations that are not inconsistent may be mixed and matched as desired. Moreover, specific mention is made of ML models composed of neural networks when discussing certain capabilities of the present invention in this disclosure. It should be noted that the present invention is not limited to neural networks nor ML for these capabilities. The present invention runs on processors implementing neural networks (also referred to herein as "models") and computer programs (also referred to herein as "modules") including but not limited to computer executable instructions stored in a non-transitory computer readable medium. The term "Whetstone" is used herein to describe the system and method of the present invention.

Specifically, embodiments of the present invention pertain to computer-implemented software that predicts system behaviors in order to: 1) assist system developers in identifying defects in their systems during development, 2) augment active systems with the capability to detect anomalous behavior in an automated fashion when encountered during operations, 3) augment active systems with the automated ability to isolate the root cause of detected fault conditions and recover/restore operations based on these conditions and 4) provide a system model for operators to simulate system behavior for various purposes. The AI model generated by this invention can be used to improve existing systems without having to fully replace them. It also means that users can implement their own functionality on top to further enhance the capability of the models.

Novel System Behavior and Fault Detection

The present invention provides significant benefit by generating models of systems requiring only system behavior data and user selected model configuration data that can predict behavior for the given system. A-priori knowledge of system architecture, design, implementation, and performance are not required and not used to generate the AI model of the system. Additional benefit is provided due to the present invention's ability to be used both in system development environments and operational/real-time environments.

Figure 15:
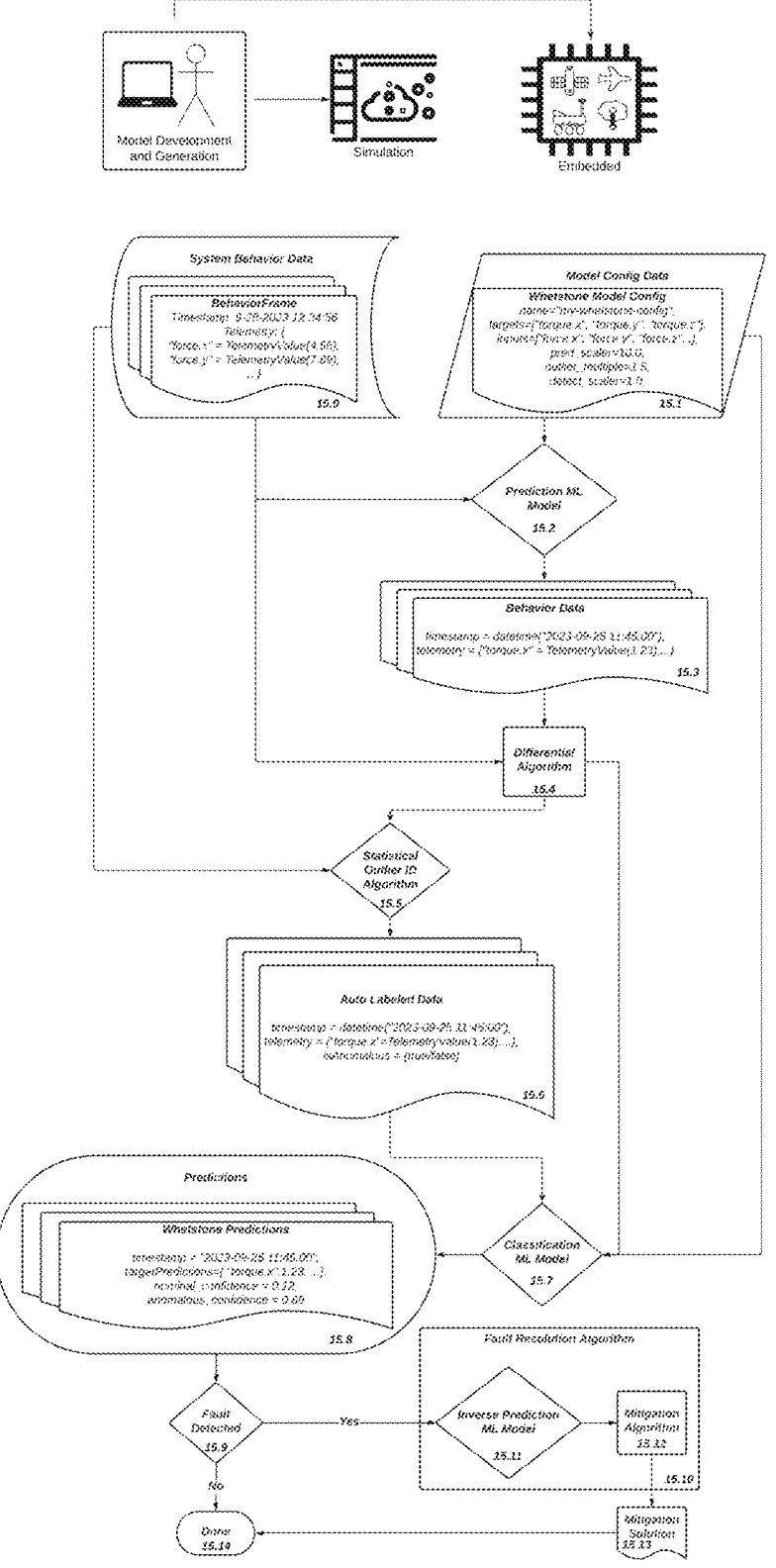
FIG. 15 is a depiction of a preferred data flow of the invention, wherein the system receives system data values of target system behavior and generates a prediction output of target system behavior along with outlier classifications.

This is accomplished by the particular illustrative embodiment of the present invention in FIG. 15 where the present invention processes system behavior data and the user selected model configuration data, generates an AI model which provides a behavior prediction and behavior classification of nominal or anomalous. This AI model can be (1) used to generate behavior predictions and anomaly classifications that are compared against system behavior data to automatically identify anomalies and/or (2) incorporated in a target system to provide fault detection capability in real-time and/or (3) utilized in a simulation environment to simulate components of a system using behavior predictions alone. This process can be iterated from the very beginning of the system life cycle, as soon as behavior data is available, greatly accelerating the design schedule by identifying performance boundaries and anomalies early in the life cycle.

Furthermore, rather than spending time developing code for the AI model and generating golden datasets with labels for AI model training, the present invention generates the model based on system data that will already be generated as a normal part of the system life cycle. The models are a no code solution, so developers don't have to write code for them. Also, no extra data is required to generate the models, just the data already generated by the system execution and testing.

FIG. 16 is a depiction of a traditional or prior art ML fault detection work flow.

Figure 17:
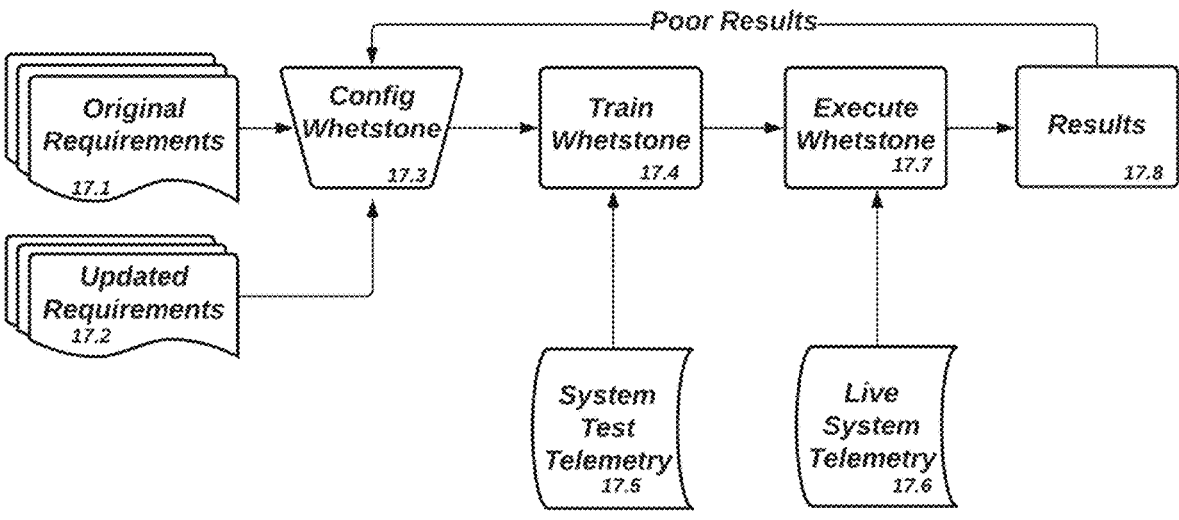
FIG. 17 is a depiction of a particular illustrative embodiment of the present invention having a different and improved fault detection work flow than a traditional work flow.

FIG. 17 is a depiction of a particular illustrative embodiment of the present invention having a different and improved fault detection work flow than a traditional work flow.

Figure 18:
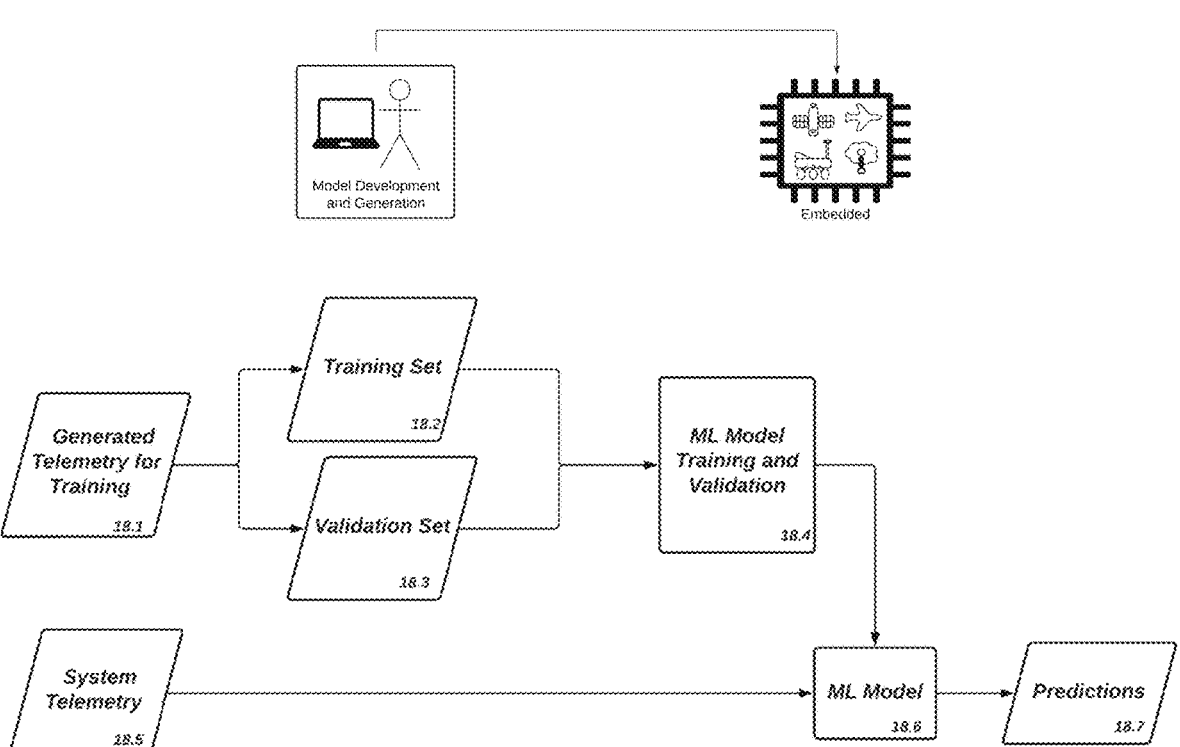
FIG. 18 is a depiction of data flow for traditional ML fault detection model training and execution.

FIG. 18 is a depiction of data flow for traditional ML fault detection model training and execution.

Figure 19:
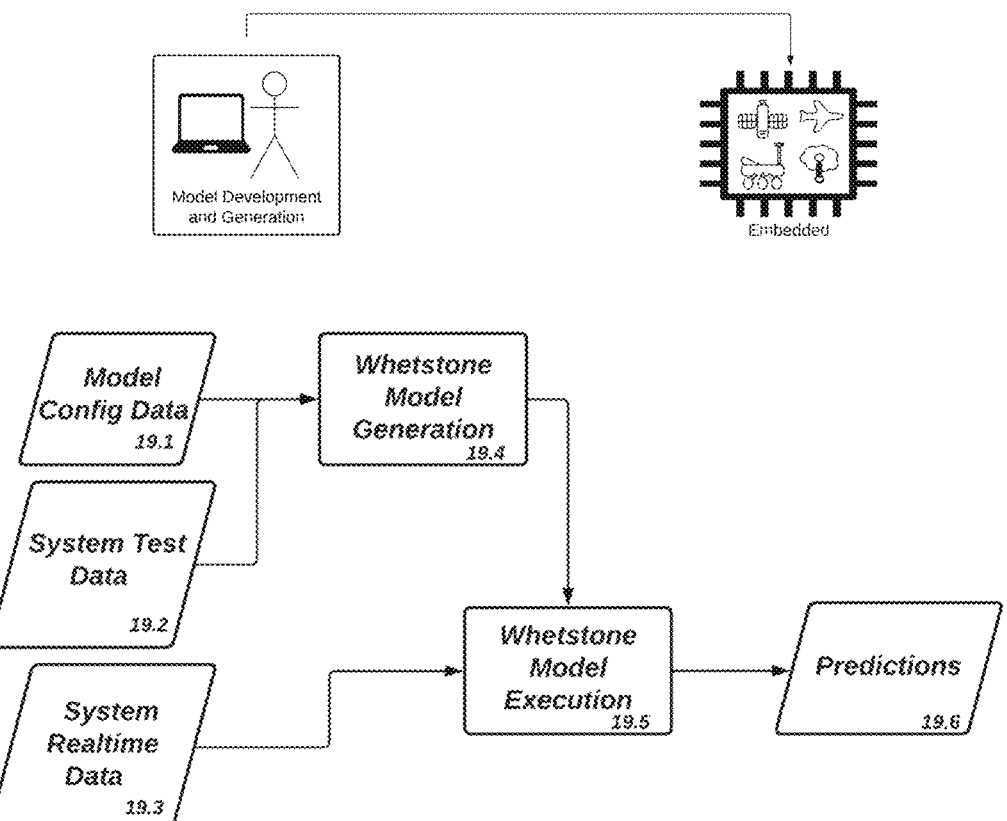
FIG. 19, is a depiction of a preferred data flow for a particular illustrative embodiment of the invention for generating an AI model for fault detection.

FIG. 19, is a depiction of a preferred data flow for a particular illustrative embodiment of the invention for generating an AI model for fault detection.

Figure 20:
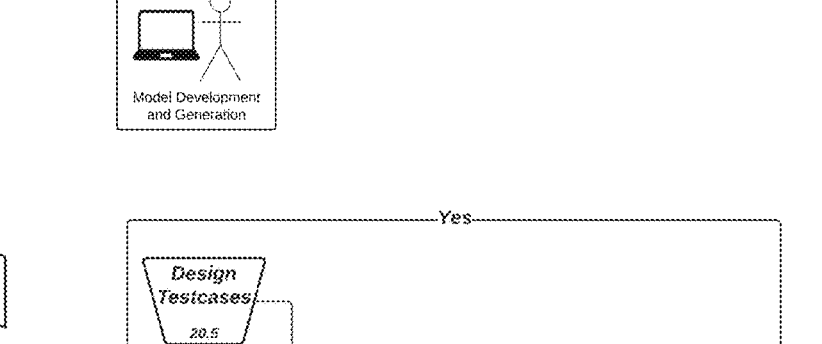
FIG. 20 depicts a traditional system test flow as used in the past.

FIG. 20 depicts a traditional system test flow as used in the past.

The present invention solution also avoids constraints of the AI model being customized per target system limiting reuse for different platforms. The models are a no code solution, so developers don't have to write code for them. Also, no extra data is required to generate the models, just the data already generated by the system execution and testing.

The present invention significantly reduces development costs by providing efficiencies in several key areas. Development time is significantly reduced by incorporating the AI model trained during system testing, or during operations, into the target systems to detect faults during operations. In comparison with both traditional fault detection and AI fault detection, the savings is noteworthy. Even when compared with AI fault detection approaches, there is significant development time savings with creating the ML prediction model via the present invention. In addition to saving development time, this approach also allows for a fault detection system that can adapt to previously unimagined emerging conditions because it can train on operational data. Fault management is also an area where great strides in efficiency are realized. Rather than manually developing mitigations to handle each potential fault, the present invention generates a fault mitigation solution specific to the precise fault encountered rather than being limited to faults defined during development and testing. The present invention tells the system what the inputs should be based on how the system is faulted.

Additionally, highly constrained resources such as hardware rich test environments are conserved as the present invention performs its processing and predictions on existing test data rather than requiring processing time in resource constrained test environments. The present invention allows for far greater exploration of the test space and greatly improves test coverage without having to execute additional tests on constrained resources.

The present invention overcomes the hurdles of high computer requirements by breaking up models of a system into smaller components and reducing the data set to only what is required for modeling those components. Rather than making a monolithic AI model, Whetstone is used to generate AI models that model individual components, i.e. one model might represent electric motor speed on a robot, while another model might represent the current applied to a motor.

This innovative approach allows for feature/component training resulting in systems only training individual models for parts of the system that have updated resulting in a smaller memory footprint, lower compute requirement, and more granular fault detections.

The present invention allows users to configure the invention to predict desired parameters based on user selected inputs without the user needing to have knowledge of ML or AI. This allows developers to focus their time on the system they are developing, testing, and operating and reduces the need to have ML/AI specialized engineers added to a team.

Figure 34:
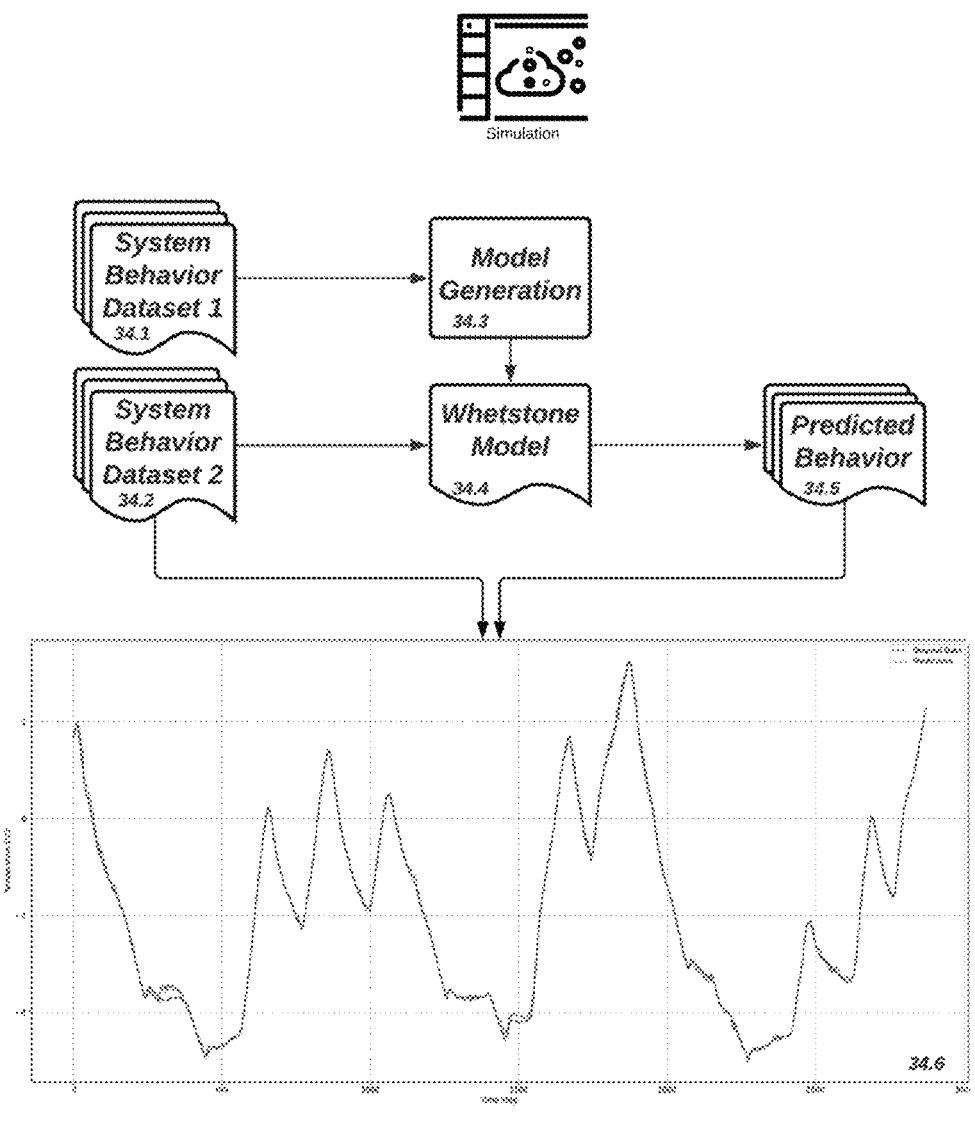
FIG. 34 depicts a particular illustrative embodiment of the invention wherein you can observe system data FIG. 34.1 (containing both the input data consumed by the system component as well as the behavior data of the system component being modeled) is used to generate a model in FIG. 34.4. When new data is passed through that model, the model's predicted behavior data (FIG. 34.5) matches the components behavior from FIG. 34.2 by observing the plot in FIG. 34.6.

The present invention's system behavior predictive capabilities are useful to replicate discrete target system hardware or software components including but not limited to, hardware devices such as temperature sensors, and inertial measurement unit (IMU) sensors, etc (FIG. 34). This is accomplished by feeding in physical testing data values for individual target system hardware components and removes the need to manually develop an accurate simulation model for a target system hardware device. Because the AI models predict behavior, that predicted behavior can be used as a simulator where instead of the traditional approach in which engineers write a complex simulation that converts inputs into some desired output, the AI model accomplishes that automatically.

Using the physical target system hardware device as a black box represented by the physical testing data, an accurate simulation of the target system can be generated based on hardware device data values. Additionally, the risk of errors due to incorrect interpretation of system documentation, or coding errors is reduced.

The present invention generated model of a target system hardware component is useful to exercise a simulated target system component in high load and high stress conditions without the risk of damaging target systems components and operating the target system component in hazardous conditions.

The culmination of these capabilities greatly improves safety, reliability, and cost-effectiveness for system behavior prediction and anomaly detection throughout the life cycle from design and development through operations of the systems. In a particular illustrative embodiment of the present invention, the system test workflow and fault detection workflow are enhanced and coupled through application of the present invention. In traditional system test and fault management development workflows, system test activities are decoupled from fault detection development activities. Through application of the present invention, the system testing, and fault detection disciplines are now coupled and streamlined as illustrated in FIG. 21.8 system test data, which is generated through the normal course of system development, is used to train the A model, removing the need to generate large datasets for training. The present invention then uses the trained AI model in the generation of system behavior predictions for comparison with the system test data to identify anomalies. The A models serve to both test software during development while simultaneously generating a fault detection capability.

The same A model trained on the system test data can be implemented as a fault detection system for the target system with an extremely low-code burden to incorporate the A model in the target system. This coupled approach to automated software testing and fault detection is a prime example of the value the present invention brings to the system test and fault detection workflows over traditional AI fault detection methods. The A model can be used on an embedded system with very low coding burden for implementation.

The A model can also train on "live" system behavior data from the target system. By being able to train on both system test data and "live" system behavior data, the present invention provides the unique ability to dynamically adapt to unforeseen and emerging conditions in remote locals. The A model will morph/evolve to new data while deployed, allowing it to better handle new environments.

Overview

The present invention addresses problems with the prior art by optimizing and combining several software components in a novel way to perform system behavior prediction and anomaly detection. Behavior prediction and anomaly detection can be performed by the present invention for any type of system, including but not limited to, software, hardware, mechanical, financial, and biological systems, as long as the respective system data are provided to the present invention in an appropriate format for consumption and processing. Embodiments of the present invention utilize a complex computer program, including but not limited to computer executable instructions stored in a non-transitory computer readable medium, which consumes system data, generates a model for predicting system behaviors, predicts system behaviors, detects outlier system data values as, anomalies and/or system defects, and indicates areas of concern in a system.

The various embodiments presented herein address specific problems with the prior art discussed above. In all embodiments of the present invention, an AI model consisting of multiple neural networks is generated and trained using the provided system data. In a first embodiment of the present invention, the trained models are utilized in the system development environment to provide valuable testing of the system, allowing developers to detect system defects and/or performance anomalies during the development process. In a second embodiment of the present invention, the trained models are utilized on target system data during operations, taking advantage of the model's trained prediction capabilities to automatically detect system faults in real-time, as pictured in FIG. 1. In a third embodiment of the invention, the trained models are utilized on the actual target system during operations, taking advantage of the AI model's fault detection capabilities to automatically attempt mitigation of system faults. The model is used for finding a mitigation solution to the detected fault.

And in a fourth embodiment of the present invention, the trained models are utilized on a user-specified software or computer platform to represent a system behavioral model, based on the system data provided. The following sections provide a more detailed description of the present invention, including its design, components, functionality, various embodiments, and prior art problems addressed. Many factors drive the design of the present invention. These factors stem from solutions to problems with the prior art and adherence to software engineering principles. Components of the present invention—models, algorithms, inputs, and outputs—leverage existing technologies and novel approaches that allow the present invention to satisfy these design drivers. Although the individual components of the present invention contain typical technologies from the prior art, these technologies have been modified, where appropriate, so that the present invention's components can be utilized and arranged in novel ways to meet design requirements.

One of the key design drivers is for embodiments of the present invention to be computer device agnostic and computer operating system agnostic. This allows embodiments of the present invention to function on various computer devices, including but not limited to, desktop and laptop computers, specially created computer devices, minicomputers, and computers on handheld devices. Also, this design driver results in embodiments of the present invention having the capability to execute on standard operating systems present on computer devices, as well as specialized operating systems utilized on computer devices (e.g., real-time and robot operating systems). Another design requirement is for embodiments of the present invention to be capable of functioning in various modes. These modes include, but are not limited to, a stand-alone mode, where some embodiments of the present invention execute as an independent computer program, and an 'in-line' mode, where some embodiments of the present invention execute as part of another computer program. These design requirements are satisfied by the modularity of the components of the present invention, which allows their reuse in embodiments of the present invention across computer devices, across computer operating systems and as an independent computer program or as part of another computer program. In addition, the requirements are satisfied by the ability to uniquely combine the modular components of the present invention, as well as the configurability of this unique combination of modular components. These properties allow embodiments of the present invention to combine and configure the present invention's components as an independent computer program or as part of another computer program that executes on any computer device as part of any computer operating system.

Flexibility of the operational focus and fidelity used to determine results of embodiments of the present invention are also design drivers. Operational foci include, but are not limited to, nominal and anomalous system behavior predictions, mitigation of system faults, system component simulation, and trend analysis of post processed system telemetry. The fidelities of the models used to determine results can range from low fidelity to high-fidelity. This lets users configure the models generated by Whetstone so they can either be very accurate at the cost of more computer resources, or use less computer resources at the cost of less accuracy.

Incorporation of this flexibility allows users to target the necessary fidelity and functionality of embodiments of the present invention to perform specific tasks. As a result, embodiments of the present invention allow full reuse of the present invention's components, and combinations thereof, for multiple purposes. The present invention satisfies these design drivers with its data-driven configurability of components and combinations of components in embodiments of the present invention. Some embodiments of the present invention can be configured to focus on fault detection and resolution, which biases towards lower-fidelity models in predicting behavioral data. This design allows the system to detect faults when trained on smaller data sets by increasing the variance found during classification training, thereby giving a larger distribution for the classifier model to train on.

Alternatively, some embodiments of the present invention can be configured to focus on the prediction of nominal system behavior, which biases towards higher-fidelity approaches in predicting these results. These would be observed in situations where the present invention is used for simulation purposes.

Components

Prior to discussing how the present invention functions, this section will discuss a particular illustration of the present invention's individual components, as shown in FIG. 15. Descriptions of each component shown on FIG. 15 will help in understanding the subsequent sections that discuss the present invention's functionality and embodiments. It should be noted that the present invention is not limited to the components illustrated in FIG. 15. Components can be added to the present invention to extend its capability, as long as the architecture shown in FIG. 15 is maintained.

Inputs—System Data and Configuration

The present invention utilizes system behavioral data to train the present invention's ML models used for prediction and anomaly detection in some embodiments. This set of data consists of a time-consistent set of system data. Given the design requirements discussed above for embodiments of the present invention to function on any computer device and computer operating system, the present invention consumes behavioral data provided in the following forms including, but not limited to, files, software memory and/or system telemetry. Each data point must be associated with a timestamp. I.E. a torque value comes in at second 1, then another torque value comes in at second 2, etc. The time stamp along with the data are used by the AI model.

The data are transferred from the provided form into data containers used by embodiments of the present invention, with a notional example of these containers provided in the pseudo-code illustrated in FIG. 23 (see structures FIG. 23.2—BehaviorFrame and FIG. 23.3—BehaviorData). Discussed further below, only a reduced amount of system data is required by some embodiments of the present invention, as compared to similar technologies from the prior art. Each data point is associated with a timestamp. I.E. a torque value comes in at second 1, then another torque value comes in at second 2, etc. The time stamp along with the data would be used by the AI model.

In order to satisfy design drivers, a configuration data set is utilized to configure certain components and some embodiments of the present invention. These data specify the system data necessary to train the present invention's ML models, as well as system data utilized to generate predictions. Specifically, configuration data designates the selected input and target variables from system behavior data. Optimally, the inputs are closely related to targets. Consider a satellite with thrusters. Each row of data from system would have a Boolean value associated with each thruster to show if the thruster was commanded on. Each row would also include forces applied to the vehicle for the X, Y, and Z axis. This is mentioning that a user must configure the AI model to use the columns for thrusters being commanded on as 'inputs' and the X, Y, and Z axis of force values to be 'targets'. The 'inputs' are the values that Whetstone models look at to make a prediction of the 'targets'. The 'targets' in the telemetry are used to train the prediction ML model, and the delta between the predicted 'target' values and the telemetry 'target' values is used train and feed through the classifier ML model.

FIG. 24 is a depiction of a particular illustrative embodiment of the invention, for performing automated software test.

The present invention's ML models are trained by using the system data variables corresponding to the inputs and targets specified by the user in the configuration data set. These input and target user choices are generally a many-to-one or many-to-many structure and can include the full behavior data set if desired. Likewise, system data variables corresponding to user-specified inputs and targets are used by the present invention to generate predictions. The present invention uses the system data variables corresponding to inputs from the configuration data set to predict values corresponding to target variables defined in this configuration data set. Afterwards, the predicted and actual system data corresponding to target variables from the configuration data set are compared for final prediction outputs from the present invention. Configuration data also contain settings for the present invention's components. An important example of one of these settings is how configuration data defines the complexity and fidelity of the prediction ML model for different embodiments of the present invention, discussed further below. Thanks to the intentional simplicity of the present invention's configuration data set, its capacity for easy manipulation by a user of some embodiments of the present invention, and ease of auditing resulting predictions of some embodiments of the present invention, the chance of human error is greatly diminished when compared with traditional system development techniques from the prior art. As shown in FIGS. 4 and 26, system behavioral data is selected (shown as a source file for this illustration), then a user of the present invention selects input and target variables from these data as part of the creation of the configuration data set (contained in file format for this illustration).

Prediction Model

The present invention's prediction model is composed of a neural network that is trained to predict system behavior. Note that although a single neural network is discussed for the present invention's prediction model, additional neural networks and support algorithms can be added (e.g., similar to ensemble methods from the prior art) or other approaches can be utilized for prediction by the present invention, as long as the design drivers discussed above are satisfied. Although this model is influenced by technology from the prior art, the model's design has been optimized to meet design drivers for the present invention. These drivers focus on alleviating the prior art problems discussed above, including, but not limited to, the need for deep understanding of prediction ML models, custom-built ML models for specific systems, the gathering and application of large sets of data used to train and validate ML models and the significant effort required to train and validate ML models. The present invention's prediction model satisfies these design drivers by utilizing an optimized approach to training and system behavior prediction. This optimization results in three (3) unique features of the present invention: (1) for some embodiments of the present invention, the model utilizes 100 percent of a reduced system data set for training, as compared to similar methods from the prior art, (2) for some embodiments of the present invention, the model can use the same training data for model validation and model re-training and (3) for all embodiments of the present invention, the model's complexity and fidelity can be "tuned" based on its "shape", which is fully data-driven based on the user configuration data set discussed above, as seen in FIG. 10. Further discussion of how the prediction model utilizes system data is detailed below. Neural networks have 'shapes' in which they define the number of inputs, number of hidden layers, neurons in each hidden layer, and number of outputs. Thus with a simple configuration change, a user can tune the complexity of a neural network, either increasing or decreasing compute requirements while increasing or decreasing model fidelity/accuracy, respectively.

Parameters that shape this model include, but are not limited to, the number of user-defined inputs, number of user-defined targets, complexity of data used for training, and model scaling coefficients. The size of each layer within the model is adjusted according to this configuration data set. Furthermore, these design drivers are met by integration of this data-driven prediction model with other data-driven components of the present invention for training and prediction.

There are several benefits resulting from this approach that address issues with the prior art. One of these benefits is that automatic adjustment of the prediction model's neural network ensures a balance between computer performance and prediction accuracy without the need for a user's deep understanding of the ML model. While the current state of the art allows users to manually define the shape and size of all the neural networks with frameworks like TensorFlow and Pytorch, our approach simplifies it so non-machine learning (ML) experts can build AI models.

Another benefit for some embodiments of the present invention is that the present invention's prediction model is capable of training with smaller data sets, including, but not limited to, system data not targeted for prediction model training. The present invention can use data that may have noise in it or some invalid data during the training process and the prediction model will still be highly accurate and viable to use.

Therefore, the present invention's prediction ML model can be trained by allowing it to simply consume system data intended for other purposes. This benefit contrasts with the drawbacks of prediction models from the prior art that require large sets of specialized data to be generated to mimic system behavior for a particular version of the target system. It should be noted that some embodiments of the present invention support extremely large datasets for training and prediction of target system behavior, while other embodiments of the present invention do not require large data sets. Not only is the need for large data sets eliminated for some embodiments of the present invention, but the significant effort also needed to gather these data and then validate the prediction models is greatly reduced. Due to the modular design of the present invention's components, another benefit of the prediction model is that the model can be generated upon training and then provided as a separate component for use within other systems. This benefit is further amplified when the present invention's prediction model is derived from actual operational system data. In contrast, the prediction methods from the prior art would not be provided as an independent component in past ML classification projects without significant modifications. See the combination and optimization of key components below for further details regarding configuration of the present invention's prediction model and its combination with other components.

Differential and Outlier Algorithms

As shown in FIG. 14, in the present invention, a differential software algorithm is used to compare differences between the prediction model's predicted system behavioral data values and actual system behavioral data values to determine a level of error of the prediction model. These differential data values are later used by the outlier identification (ID) algorithm, training of the anomaly classification model, and as an input to the generated classification model.

The present invention's statistical outlier ID algorithm (module) is used to identify data values as nominal or anomalous. Note that although a statistical outlier algorithm is discussed, alternate outlier approaches can be utilized by the present invention. Composed of 1 or more outlier ID algorithms, this module consumes and processes differential data values and predicted system behavior data values. Outliers identified from these data are then used to automatically label predicted and actual system data values. Values labeled as anomalous have the largest delta within a given dataset. Data consumed by the outlier algorithm that do not meet these criteria are labeled as nominal data values. Automatically labeled data are fed into the classification model for training. Outlier detection coefficients are adjusted slowly (to a maximum threshold) based on the provided data values until at least one outlier is found.

For example, in one embodiment of the present invention, a system may have one coefficient which is a multiplier of the standard deviation used to automatically detect anomalies. Assuming a dataset had a standard deviation of 1.0 and the coefficient was set to 1.0, then the observed and predicted delta would be labeled anomalous when the delta was greater than 1.0. If in a given dataset no anomalies were detected, the coefficient could be adjusted to result in a lower threshold until an anomaly was detected. Taking our example, assuming the largest delta was 0.95, the coefficient could be adjusted until 0.95 was achieved and an anomaly auto labeled.

If, after adjusting the coefficients (FIG. 22.6), an outlier is still undetected, a sample with the largest delta within the dataset is selected and labeled as anomalous. This step is preferable in order to train the present invention's classification model, as all classifications should be present for its proper training.

Classification Model

The present invention's classification model is a neural network that is trained to classify predicted values from the prediction model. As with the prediction model discussed above, although a single neural network is discussed for the present invention's classification model, additional neural networks and support algorithms can be added (e.g., similar to ensemble methods from the prior art) or other approaches can be utilized for classification by the present invention, as long as the design drivers discussed above are satisfied. Classification by the present invention is performed by generating confidence level values for both the nominal and anomalous prediction values for a specific target variable, as provided by the outlier ID algorithm and specified in the configuration data set. This model can classify predictions for multiple targets on a target-by-target basis. The model produces a prediction of what the behavior should be, and also produces two additional floating-point numbers, ranging from 0.0 to 1.0, for each predicted value to classify the prediction as nominal or anomalous. The range mentioned above is a confidence level where a value of 1.0 represents 100 percent confidence that the data point is nominal or anomalous. These confidence level data values are stored in labeled fields in a data structure in the non-transitory computer readable medium along with associated telemetry data values, prediction values and a timestamp. Looking at FIG. 15.7 and FIG. 22.9, in the present invention, the classification model is trained by consuming predicted and actual system behavioral data values, using the auto-labeled data values for validation and training purposes. Specifically, these auto-labeled data values are used to automatically update weights of the classification model's neural network. The classifier generates confidence levels for nominal and anomalous labeling allowing users to ensure confidence in the systems labeling. These confidence levels can be used to determine the ultimate label based on criticality of an anomaly vs nominal case, for instance a human rated spacecraft may treat all anomalous confidence levels over 50% to be true anomalies where logistics robotics may require a rolling average of over 75% confidence levels before labeling as a true anomaly.

Key design drivers mentioned above for the prediction model also influence the constitution and usage of the present invention's classification model. As with the prediction model, the same data utilization features (e.g., reduced training data set, reuse of training data for validation, etc.) apply to this model as well. The present invention's classification model is automatically and dynamically sized based on the number of inputs and targets selected and subsequently defined in the configuration data set, with an output layer size of 2 times the number of targets (due to a set of nominal and anomalous confidence levels for each target variable). This can be observed in FIGS. 10 and 22.

To give an example of how the classifier can be automatically adjusted based on data to process, take an example of a model config with 50 inputs and 3 targets. The classifier model would be automatically configured to have 6 inputs (2*3 targets) a single hidden layer of say 100 neurons (adjusted based on performance settings provided by the user), and an output layer of 2. Note that this is a simplified example and things like standard deviation of prediction deltas and amplitude of signals can affect the middle layer, i.e. imagine a prediction delta standard deviation of 100 and amplitude of 500, this could increase the hidden layer size to ~250.

A primary benefit of the present invention's classification model is that unlike classification methods from the prior art that use basic thresholds for determining anomalies, the present invention's classification model allows for far more complex relationships between expected behavior and observed behavior in a fully automated manner. In contrast, prior technologies typically required engineers to write specific thresholds and complex algorithms in order to process many inputs.

As an example, consider a motor, as found in most mechanical systems, commanded to spin at some desired value of revolutions per minute (RPM). Using methods from the prior art, having a simple commanded RPM versus observed RPM delta check would result in false positives for anomaly checks due to the range of RPMs, spin-up time of the motor and resistance on the motor. This is improved in the present invention's classification model by utilizing neural networks to simulate the human mind and find statistical patterns in large sets of inputs, ensuring accurate predictions with few false positives. While methods from the prior art can overcome this, they require many layers of checks resulting in far more development effort and time. The present invention's classification model allows for all the complex relationships necessary, providing higher accuracy with less effort.

Turning to FIG. 15.8 and FIG. 22.11, the present invention's prediction system output includes, but is not limited to: (1) target system behavioral data value predictions from the prediction model (see FIG. 15.3), (2) classifications of predicted data values from the classification model (see FIG. 15.7), and (3) the mitigation of detected system faults (see FIG. 15.10). This combination provides an easy-to-use anomaly classification capability along with metadata defining the predicted target system behavior data. By providing the predicted behavior data values and anomaly classifications of individual targets, the present invention provides more robust information than is typically provided by similar technologies from the prior art. Since the current state of art would only provide classifications, the addition of behavior predictions results in better transparency to the behavior of the model and more importantly the ability to automate fault mitigation. As illustrated in FIG. 15.11, when a fault is detected, the predictions from FIG. 15.8 are used to determine a mitigation solution FIG. 15.13. Specifically, the novelty of the invention is the use of the prediction algorithm as a baseline for the classifier.

Figure 32:
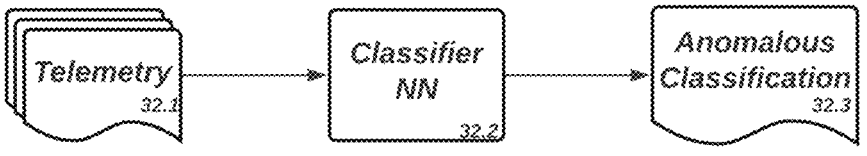
FIG. 32 depicts the current state of art that uses a singular neural network which provides a classification based on a set of inputs.
Figure 33:
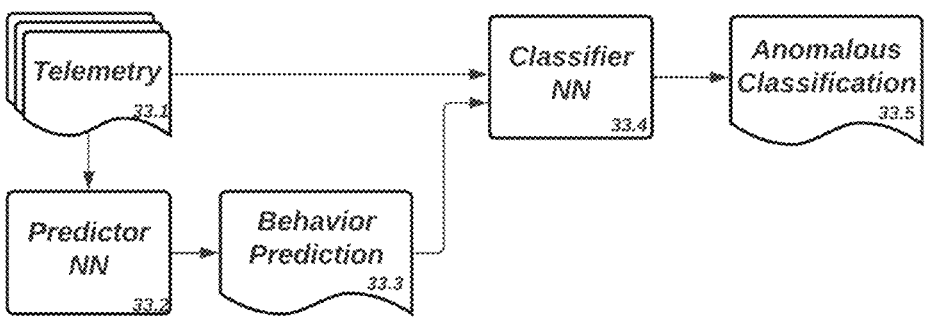
FIG. 33 depicts an illustrative embodiment of the invention having a prediction neural network (see FIG. 33.2) is used to generate a behavior prediction (FIG. 33.3), providing context to the classifier (FIG. 33.4). The extra context allows for reduced computational complexity of the classifier neural network and increased transparency into the anomaly detection process in the form of behavior predictions (FIG. 33.3) and anomalous classifications (FIG. 33.5)

Current state of art uses a singular neural network which provides a classification based on a set of inputs (see FIG. 32). This differs from the present invention's methodology in which a prediction neural network (see FIG. 33.2) is used to generate a behavior prediction (FIG. 33.3), providing context to the classifier (FIG. 33.4). The extra context allows for reduced computational complexity of the classifier neural network and increased transparency into the anomaly detection process in the form of behavior predictions (FIG. 33.3) and anomalous classifications (FIG. 33.5).

This combination of metadata and anomaly predictions allows system developers and operators to audit the decisions made by the components of the present invention, ensuring models are properly configured and sufficiently trained. Metadata here being the predicted behavior data allows users to see delta behavior data by way of comparing observed behavior vs predicted behavior. Additionally, these data adequately inform the creation of future input-target pairings as well as paths for fault mitigation. Combination and Optimization of Key Components As mentioned above, some components of the present invention are combined and optimized in novel ways to meet design drivers. The specific combination of the present invention's prediction model, automatic data labeling capability and classification model was chosen to improve prediction output accuracy while providing fast compute performance for some embodiments of the present invention. The combination of using the prediction model as a standard to compare behavior, then using statistical outliers as a labeling mechanism for the classifier model improves accuracy over just a model predicting anomalies on an unstructured dataset. The break down in this method also allows the models to be significantly faster as the neural networks required to consume the data and perform classification would be very large and very computationally expensive.

The approach improves upon the prior art via optimizations that are necessary to meet design requirements. For example, the prediction model is intentionally simplified for some embodiments of the present invention to satisfy design drivers, including, but not limited to, computational speed, computer device/operating system independence and minimal user interaction for training. While using the prediction model alone could be done, a noisier signal would typically result in a higher false positive rate. To solve this, we also include a neural network based classifier model which learns how to handle the noisy signal, allowing the prediction model to be computationally optimal while still allowing the classifier to produce valid and accurate predictions. Combining and optimizing these components in this way provides a design solution that hits the "sweet spot" between computational speed, platform independence and prediction output accuracy. Using the two ML models together is what allows the present invention to achieve the performance and accuracy required for real-time fault detection.

Note that although a minimal set of ML models is illustrated for the present invention, nothing prohibits the use of additional ML models and combinations thereof as long as these additions still result in the present invention meeting the design drivers specified above.

Optimizing the prediction model for the design drivers discussed above for some embodiments of the present invention results in sub-optimal prediction performance. As with prediction model training from the prior art, the present invention's prediction model trains to minimize loss. Drivers for some embodiments of the present invention, such as computational speed and computer device flexibility, produce a higher loss prediction model. This is acceptable because the goal for some embodiments of the present invention is to identify the worst outliers and any behavior that is unpredictable, versus generating a highly accurate prediction model with minimal losses. While the average loss for some embodiments of the present invention can be minute, the immediate loss for some predictions can be great. It is important to note that predictable system behavior is considered nominal for the present invention while unpredictable behavior is deemed anomalous. Therefore, some embodiments of the present invention treat greater losses as unpredictable system behavior (i.e., anomalies).

Classification model training is enhanced by utilizing automatically labeled data. After the prediction model generates predictions of system behavior, the differential and outlier identification algorithms identify the worst outliers and any unpredictable behavior. Nominal and anomalous data from these algorithms are automatically labeled by the present invention. The worst outliers and unpredictable behaviors are labeled as "anomalous," and the predictable behaviors are labeled as "nominal." Automatic labeling reduces the human interaction needed to improve accuracy of the present invention's prediction output. The combinations and optimizations of components discussed in this section also have implications on how system and configuration data are utilized within some embodiments of the present invention. These items are further discussed in the sections below.

1.1.1 Functionality

The functionality of all embodiments of the present invention is centered on training its ML models and making predictions of system behavior using ML models generated upon training. FIG. 15 shows a high-level diagram of a preferred architecture of the present invention. FIG. 22 illustrates pseudo code corresponding to an architecture of the present invention shown in FIG. 15. These figures will be used to discuss the training and prediction approach of the present invention, as well as the components involved and the sequence in which they are executed. Where appropriate, further details of this approach and the component combinations and optimizations discussed above will be provided. Note that the present invention is not limited to the training and prediction approach discussed herein.

1.1.1.1 Functional Flow

All embodiments of the present invention can be executed in training mode or prediction mode. An advantage of this capability is that for some embodiments of the present invention, a pre-generated ML model running on a target system should not need to be trained (although it can be re-trained as necessary). The model, once trained, can be used for predicting faults, but also be incremented and trained in deployment, further improving its capabilities.

Referring to FIGS. 15 and 22, the present invention begins by loading system behavioral data values FIG. 15.0. These data can be loaded independently for either operational mode: for prediction model training FIG. 22.0 or for the generated prediction model to provide predictions FIG. 22.3. In order to automatically generate the present invention's prediction FIG. 15.2 and classification FIG. 15.7 models, the present invention utilizes a model configuration data set FIG. 15.1, including but not limited to a user's choice of 'input' and 'target' variable data values from the target system data values FIG. 15.0 and prediction model settings. In order for Whetstone to build an AI model, the user provides a model configuration in which they select the input variables and the target variables required for the model. In order for Whetstone to build an AI model, the user provides a model configuration in which they select the input variables and the target variables required for the model.

As with system behavioral data, configuration data can be loaded independently for different operational modes—data are loaded for prediction model training FIG. 22.0 and to generate predictions FIG. 22.3. When the present invention is training FIG. 22.2 the prediction model FIG. 15.2, the process begins with the creation FIG. 22.1 of the prediction model's neural network. The size and shape of the prediction model's neural network is based on the user's provided inputs and targets, as well as performance levels, such as higher accuracy or higher speed, which are specified in the configuration data set FIG. 15.1. The present invention automatically configures neural networks based on the input and target configurations, as well as other data characteristics, such as distribution, amplitude, and variance.

Training FIG. 22.2 of the prediction model utilizes both the input and target variables from system data specified in the configuration data set FIG. 15.1, and results in the generation of a prediction model capable of generating system behavior predictions.

Once a prediction model has been generated, system behavioral data predictions FIG. 15.3 are produced FIG. 22.4, that is, data values are generated for how the target system data values should look at a given time based upon the AI model predictions. Note that only the input variables from system behavioral data are utilized to generate FIG. 22.4 predictions, with the predicted system values corresponding to the targets selected by the user in the configuration data set FIG. 15.1. The prediction data values generated by the prediction model are then sent to the differential software module FIG. 15.4 to calculate FIG. 22.5 the difference between the predicted target system behavior data values and the actual target system behavior data values shown in the target system data FIG. 15.0. An outlier software module FIG. 15.5 then consumes and processes FIG. 22.6 data provided by the differential software module FIG. 15.4 to find the worst outliers.

In training mode, the present invention creates FIG. 22.7 the classification model's FIG. 15.7 neural network after the worst outliers have been determined by the outlier software module. The size and shape of the classifier's neural network is based on the user's provided inputs and targets, as well as other settings specified in the configuration data set FIG. 15.1. Since auto-labeled data is required to train the classification ML model FIG. 15.7, the present invention automatically labels FIG. 22.8 anomalous (unexpected) and nominal (normal expected) data values FIG. 15.6 provided by the outlier software module FIG. 15.5. These data include, but are not limited to, values that are stored in data structure fields for timestamp values, system data values, and values indicating classification of either nominal or anomalous. Upon labeling data, the present invention can begin training FIG. 22.9 of the classification model FIG. 15.7. In training mode, the classification model uses these auto-labeled data FIG. 15.6 and actual FIG. 15.0 and predicted FIG. 15.3 system data corresponding to user-configured target variables FIG. 15.1 for training. Successful training results in the generation of classification model FIG. 15.7 capable of generating classification predictions.

Take the example above in which the present invention's anomaly detection model used to monitor forces on a satellite with 16 thrusters and 1 main engine. In this case, the present invention would configure the classifier model's input layer to be 3*2=6 in size (3 for the original force telemetry and an additional 3 for the prediction model's output), a single hidden layer with size of say 100 (assuming a standard deviation of 1.0), and an output layer of size 1 (a confidence level for nominal and anomalous predictions). While a simple example is provided here, the number of hidden layers and neurons in each hidden layer could be adjusted based on user fidelity and computer resource requirements.

In another example, configuration parameter of fast compute, low fidelity and a system of 16 thrusters targeting 3 axis of force. Prediction neural network would be configured with 16 inputs, a single hidden layer of 32 neurons, and an output layer of size 3. Classifier neural network would be configured with 3 inputs, 1 hidden layer of 100 neurons, and 2 outputs.

In another example configuration parameter of slow compute, high fidelity and a system of 16 thrusters targeting 3 axis of force. Prediction neural network would be configured with 16 inputs, 3 hidden layers of 3200, 320, and 32 neurons respectively, and an output layer of size 3. Classifier neural network would be configured with 3 inputs, 3 hidden layers of 10,000, 1,000, and 100 neurons respectively, and 2 outputs.

In another example, Input length of 16, target count of 3, data standard deviation of 100 with data signal amplitude of 100,000, and a prediction scaler of 3, would result in a prediction neural network of the following shape. 16 inputs, 3 hidden layers with 3200, 320, and 32 neurons respectively, with an output size of 3. The classifier neural network would then be generated with shape of 3 inputs, 3 hidden layers with 10,000, 1,000, and 100 neurons respectively, and an output count of 2.

In another example, Input length of 16, target count of 3, data standard deviation of 1 with data signal amplitude of 1000, and a prediction scaler of 1, would result in a prediction neural network of the following shape. 16 inputs, 1 hidden layer with 32 neurons, with an output size of 3. The classifier neural network would then be generated with shape of 3 inputs, 1 hidden layer with 100 neurons, and an output count of 2.

Once a classification model has been generated, the classification model makes classification predictions FIG. 22.10 containing confidence level values. These values are determined by using actual system data FIG. 15.0 and predicted system data FIG. 15.3. The present invention's prediction system output FIG. 15.8 contains predictions FIG. 22.11 of data values that include, but are not limited to, a timestamp value for the prediction data value, an expected system data value at that time indicated by the timestamp, and confidence level data values of nominal versus anomalous data for each system data value at the given time.

Data Utilization

A major advantage of the present invention is its efficient use of system data for training and predictions. As noted, the present invention's simplified prediction model executes rapidly while maintaining high accuracy, thereby reducing the risk of overfitting in certain embodiments.

When overfitting could arise (e.g., due to limited training data), an outlier detection algorithm identifies the most extreme outliers, and a classification model examines these outliers to establish a scaler-based threshold for valid error rates. By combining auto-labeling with neural networks, the present invention employs a mechanism akin to a dynamic threshold in place of a fixed threshold. For instance, the present invention does not rely on a rigid tolerance (e.g., one-degree temperature variance) to flag a fault; rather, it integrates various input signals to determine fault conditions, with the threshold shifting according to the amplitude of those signals.

Because of this design, overfitting remains a minimal concern in certain embodiments. Consequently, no specialized data need be generated solely for training or validation: system data originally produced for other purposes (e.g., testing, operations) can be repurposed to train and validate the machine learning models. This approach, especially when combined with the present invention's auto-labeling capability, significantly decreases the workload required to develop and maintain these ML models.

Figure 11:
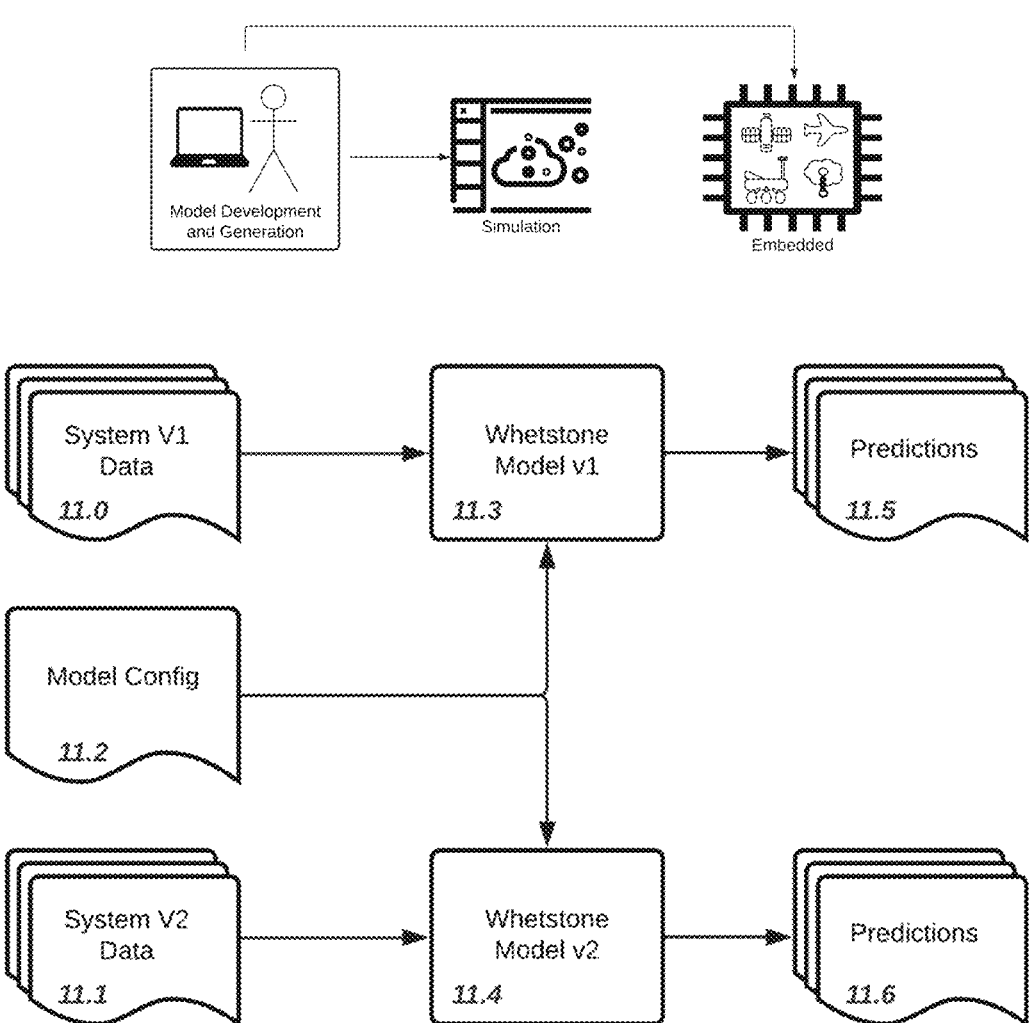
FIG. 11 is a depiction of a particular illustrative embodiment of the invention showing prediction model training, wherein training the prediction model uses all of the behavioral target system's data values that were provided to the present invention.

Turning now to FIG. 11, the present invention trains its prediction model based on the specific version of the target system's behavior data to maximize the accuracy of the model. The system test data can be used without a hand built data set for training models to be generated separately.

For some embodiments of the present invention, the present invention's minimal vulnerability to overfitting allows for 100 percent data utilization during model training. This means that there is no requirement to set aside a test set from the training data, as is typically performed for training methods from the prior art. In order to specify the subset of system data required for generating a model, the present invention utilizes the configuration data mentioned above, where users can select significant inputs for the targets they want predicted. Unlike other ML and AI models where typically 80% of the data can be used for training while the other 20% is used to validate training accuracy, we can use 100% due to how the ML models are broken down and how they are used.

Figure 12:
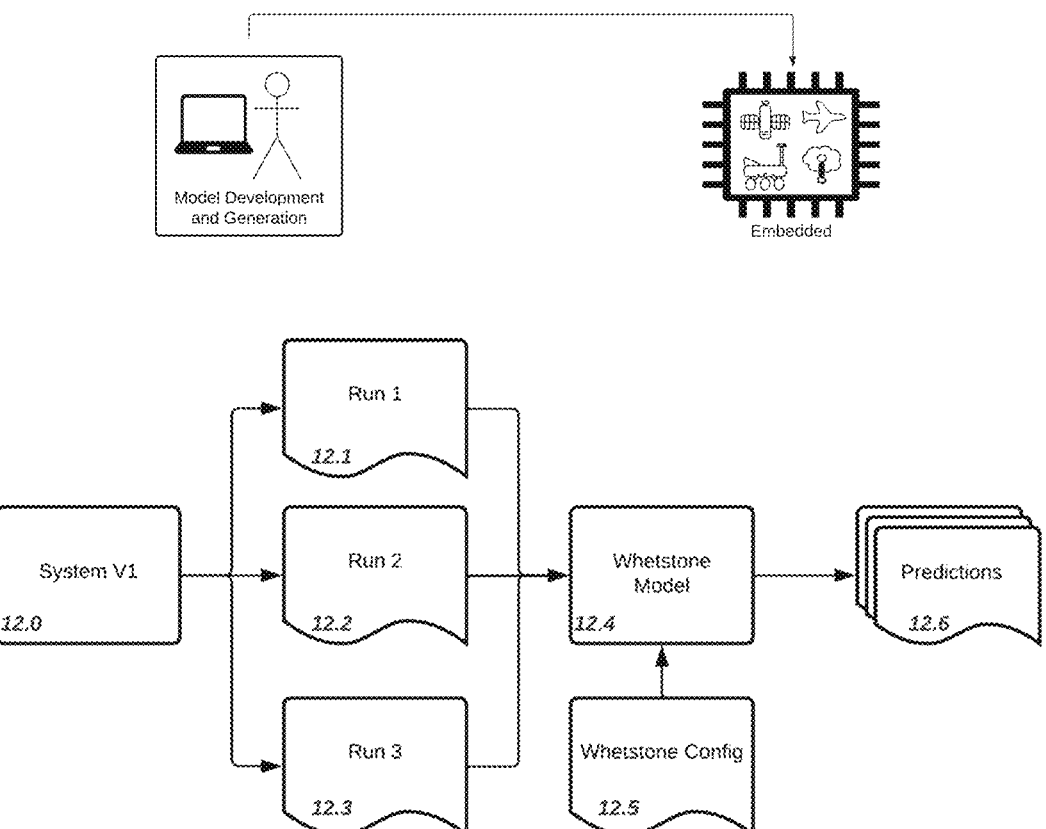
FIG. 12 is a depiction of a particular illustrative embodiment of the invention. When using the system as a testing tool, the prediction model software module is trained on data values generated by the target system under test.

Turning now to FIG. 12, in a first embodiment of the present invention, when using the present invention for system testing, the prediction model is trained on data values generated by the same version of the target system under test, using real system test data to generate the model. Most models would be pretrained on a set of data, then have the test data run through to find anomalies. We don't need a separate dataset, we can train on a set of data and still find anomalies within the dataset.

These data values can be combined from execution of the target system with different initial conditions if the data values are from the same version of the target system that the user wants to test. The present invention provides a significant benefit of greatly reducing the workload required to generate specialized data sets corresponding to various operational scenarios for ML model training and also removes the need to identify and isolate test data sets from the training data.

FIG. 13 is a depiction of a particular illustrative embodiment of the invention, when using the prediction model of the present invention as a fault detection system, the same prediction software module trained by the testing tool is used on the system to detect real time data value faults.

Figure 2:
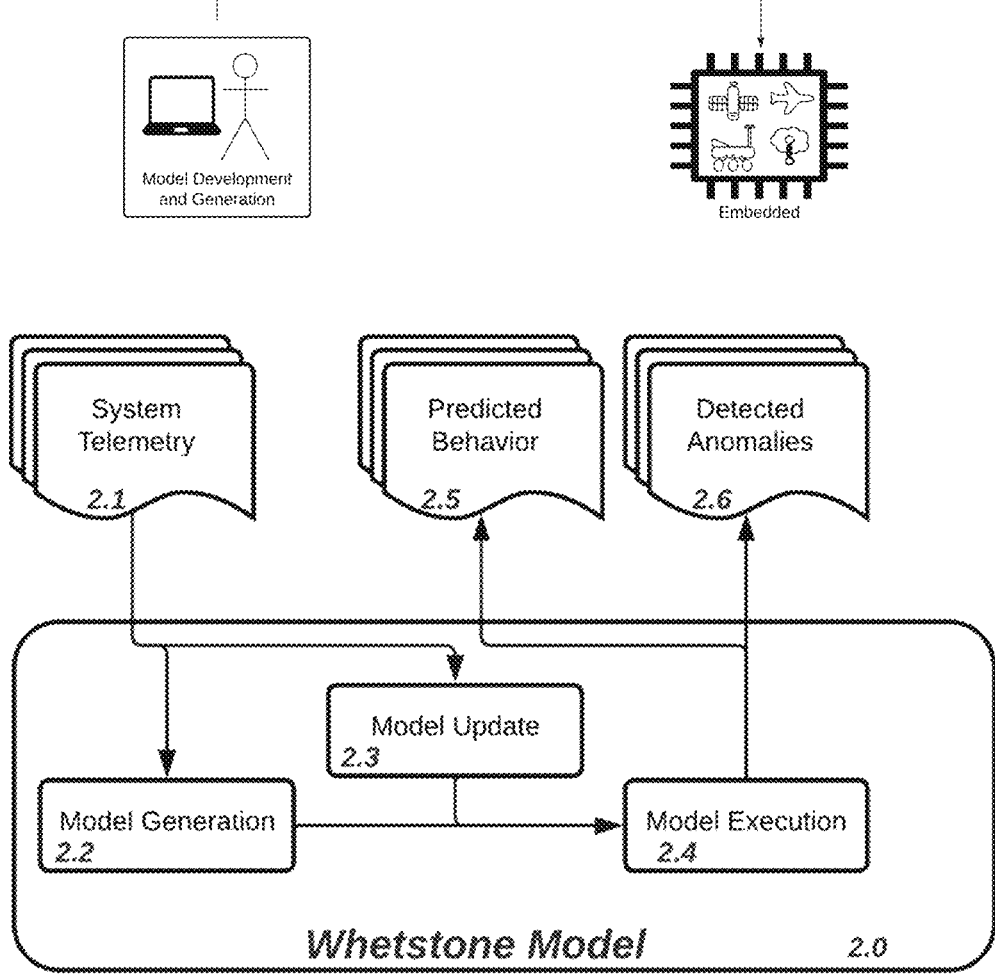
FIG. 2 is a depiction of a particular illustrative embodiment of the invention, wherein after the AI fault detection model detects anomalies, the present invention automatically generates predicted behavior.

In addition to not requiring specialized training datasets, certain embodiments of the present invention can reuse the entire training dataset for making predictions, as illustrated in FIG. 2. In contrast to prior-art systems, where reusing 100% of the training data often leads to overfitting and inaccurate predictions, these embodiments exhibit minimal vulnerability to overfitting, enabling accurate predictions even when trained and tested on the same data. Typically, using a single dataset for both training and prediction raises overfitting concerns; however, by decomposing the data in a particular manner, the present invention substantially mitigates that risk.

FIG. 3 shows an illustrative embodiment where the present invention recognizes a relevant signal despite a 75% error rate in the data—similar to how it detects software defects or system faults, even if trained on imperfect data. This resilience stems from the optimizations described above, in which the model focuses on identifying the most extreme outliers. Moreover, by reusing 100% of the training dataset, the same data can serve as both the training and validation set, thereby eliminating the need for specialized test data and significantly reducing overall workload.

In one embodiment of the present invention, system testers can purposely inject anomalies into a training data set and then use that same data set to validate the prediction model by ensuring it predicts these same anomalies when generating predictions. Additionally, in some embodiments of the present invention, making predictions with the same data used to train the prediction model could highlight unexpected system performance issues. Utilizing a first embodiment of the present invention for early-stage testing of target systems allows engineers, scientists, and other target system developers to find defects earlier in the system software development life cycle and refines their target system's design. This results in better testing as the target system design progresses, enabling the present invention's models to improve as the target system design evolves and changes.

This data reuse benefit extends beyond model validation and the discovery of previously unexpected anomalies. Another feature of data reuse is in re-training the ML models for some embodiments of the present invention. After the present invention's trained ML models generate predictions for some embodiments of the present invention, users can examine the prediction output results and determine whether re-training is needed. If the prediction outputs show "false positives" for outlier predictions, users can make adjustments to the configuration data set to capture these false positives and repeat the ML model training process discussed above with the same training data set. This process can be repeated until the prediction accuracy for the ML models reaches the desired accuracy. Although this process would incur some workload required specifically for ML model training and validation, it still is much less than the workload required for similar methods from the prior art given the other benefits discussed above.

Another significant benefit to reducing the workload required for classification model training is that prediction model results are automatically labeled. As mentioned above, data from the outlier module are automatically labeled as nominal or anomalous. Using labeled data improves the accuracy of classification model training. Automatically labeling these data removes the need for user intervention to ensure that data are properly labeled as anomalous or nominal. This feature, and the other data utilization features discussed in this section, allow for a low workload approach to training the present invention's ML models for some embodiments of the present invention.

Example Embodiments

The present invention is useful for many industries and applications. Listed below are several examples of useful application of the present invention.

Automated Software Test

To illustrate one example of how the invention may be used for automated software testing, the case of satellite software developers testing the software used to operate the satellite and its systems (collectively known as "flight software") as it matures through the life cycle is discussed below. In order to accomplish thorough flight software testing, a satellite simulation is developed to model the satellite systems and the space environment it operates in, for use in testing the satellite's flight software. Software models are built of actuators, in this case, reaction control system (RCS) jets. The satellite Guidance, Navigation and Control system (specifically, the control algorithm) determines when the RCS jets should fire. The onboard satellite flight software is run within the satellite simulation. You can run flight software either built into the simulated environment or externally and linking via some comm network to the sim. Test cases are developed to exercise the control system within the simulation. Test case scenarios are executed, and test results are recorded in log files. All data, including flight software telemetry, and simulated satellite system/environment data are recorded.

Figure 9:
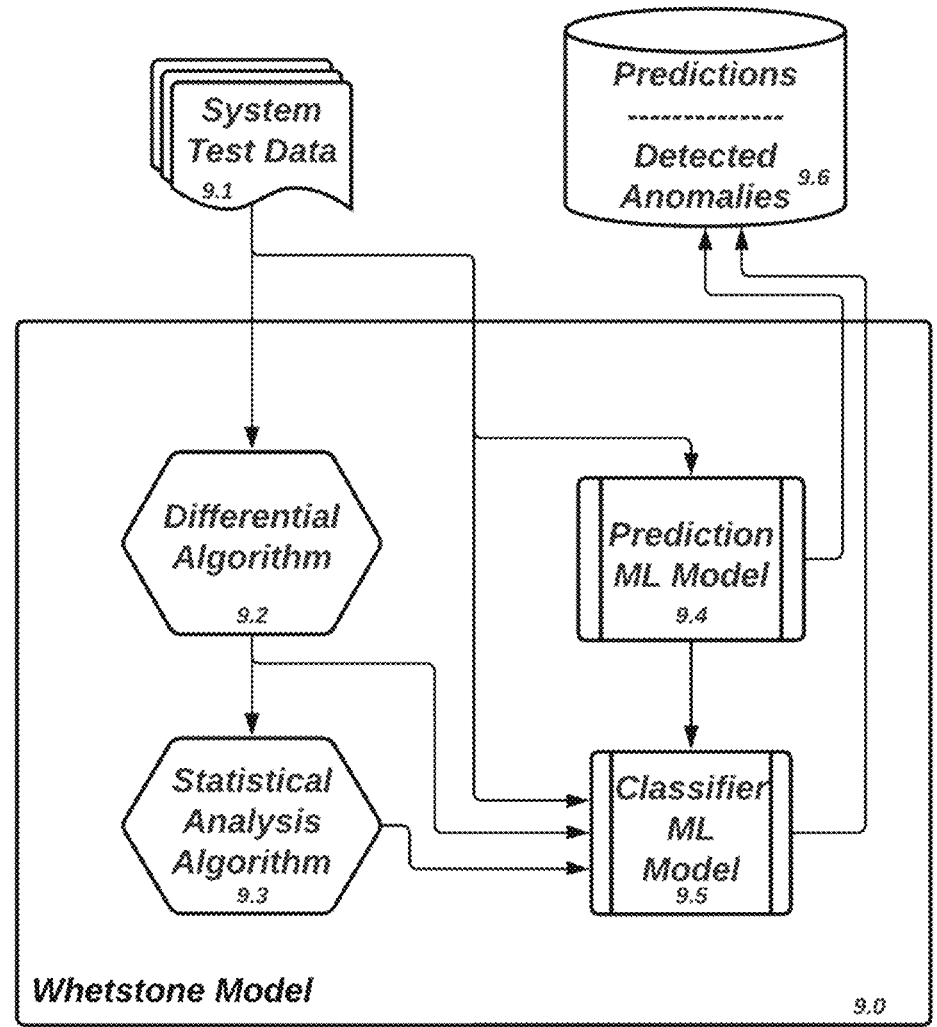
FIG. 9 is a depiction of a particular illustrative embodiment of the invention wherein system test data is fed to a differential, statistical and classifier algorithm that feeds a prediction ML model that feeds detected anomalies to the predicted behavior model.

As illustrated in FIG. 9, System Test Data in the form of behavioral data, log files generated during the tests are fed into the present invention to train the ML models, resulting in a representative model of the system under test. The developer selects "inputs" and "targets" they want the present invention to process. Targets are selected for items of interest, in this case, resulting torque on the satellite is selected. To select inputs, the developer selects inputs that are directly related to the target (torque) under study, in this case, RCS jet force and jet on-times are selected as the inputs. The exact inputs and targets that would be selected for this example. It is just to make it clearer that the idea is to choose inputs that directly to the target. Since in the sim example the only thing affecting the torque on the vehicle are thruster firings, then all you give the model as an input are thruster on times. After ML model training is complete, the flight software data are fed into the present invention again, this time to be compared against the trained present invention's ML models results/predictions. This is done to allow users to validate the accuracy of the present invention's ML models and test the flight software. The present invention model compares its own control system predictions (from the trained representative model of the system under test) against the actual flight software control system test results. When the present invention's results sufficiently differ from the actual flight software test results, outliers (unexpected values, anomalies, or defects) are identified for user investigation. System developers will analyze the anomalies by investigating the conditions surrounding the anomaly and investigating the flight software for possible defects. This process continues through the development process. When updates are made to the flight software, the tests are rerun and are fed into the present invention again to retrain the model so that it is now tuned to the version of flight software under test. As the flight software and test cases grow and mature, the present invention retrains on the new system behavior data.

Automated Fault Detection

To provide automated fault detection, the ML models trained and used for the first embodiment of the present invention (automated software testing) are loaded or "embedded" into target flight system software providing a low-code approach to fault detection that simplifies utilization of the model and reduces complexity. For real time fault detection on an embedded system, up to two lines of code are required, one to load the model and one to execute the model. This could be accomplished with as little as one line of code (also referred to herein as a Config parameter), however, for performance reasons users would typically load the model upon system initialization and execute the model on subsequent control loops.

Developers have insight into the reliability and accuracy of the fault detection model in predicting faults in the target system's hardware and software. In particular embodiments of the present invention, analytical tools are provided, as shown in FIG. 5, allowing developers insight into the quality of the invention's predictions and supporting enhanced system risk analysis. Additionally, as illustrated in FIG. 26, a model configuration graphical user interface (GUI) can be used to easily configure the present invention's models. The same type of artifacts (behavioral data predictions and anomaly classifications) used for analysis will also be produced after deployment in target systems to detect system faults, allowing ground teams to both track a target system's hardware and software functionality as well as see and adapt to emergent conditions in the target software, hardware, and environment before emergent conditions become a problem. Ground teams will be able to see trends in the data that can point to potential future failure points. They will get predictions for behavior, the actual behavior, and anomaly confidence levels that will allow them to make informed decisions about the health of the vehicle or some component therein.

FIG. 6 and FIG. 7 depict the accuracy of a particular illustrative embodiment of the present invention's prediction capabilities.

FIG. 8 depicts a Whetstone model lifecycle where a model is generated on a target system with live telemetry, then tested on ground, and a usage/deployment decision is made based on the testing of that model.

In this particular embodiment of the invention, a low-code approach to fault detection is provided that simplifies utilization, reduces complexity, and allows developers to focus on the other components of fault management—fault isolation and recovery. The following is an example of the code required to load the model and the loading of system data (system telemetry in this case).

myFaultModel=whetstone.load("fault_model.wsfin");
    . . .
    hasFault=myFaultModel.check(telemetryData);
    . . .

The low code solution adds minimal overhead to implement a powerful fault detection system as shown in this particular embodiment of the invention, greatly reducing the effort for building fault detection systems by hand which may result in thousands of additional lines of code.

To illustrate one example of how the invention may be used for automated fault detection, a scenario consisting of onboard automated fault detection by an operational satellite is discussed below. Note that this case assumes the use of pre-generated ML models from prior training. Turning now to FIG. 25, in a particular illustrative embodiment of the invention, an automated fault detection use case depicted. At FIG. 25.01 live system data is fed to FIG. 25.02 trained model to execute fault detection (FIG. 25.05) to generate predictions (FIG. 25.06). If system behavior differs significantly from predicted behavior, the present invention's fault detection functionality will raise a fault flag. The system can then handle any discovered faults and continue (FIG. 25.10) operation (if possible).

Ground operators and SMEs (FIG. 25.07) can analyze the detected faults by investigating the conditions surrounding the fault and investigating the satellite system behavior and performance. If further investigation reveals an accurate fault detection, ground operators have an opportunity to interact with the satellite to try and alleviate the erroneous conditions. Likewise, if investigation reveals an inaccurate fault detection, ground operators have an opportunity to interact with the present invention to configure it to enable 'online learning' (FIG. 25.09) in which the system increments on the present invention's model with live telemetry. Once online learning is enabled, as new telemetry is generated by the system (FIG. 25.01) the system will check the config to see if online learning is enabled (FIG. 25.03). If enabled, the system will update the present invention's model based on the new data (FIG. 25.04) for future telemetry to use. Ground teams (FIG. 25.07) can continue to monitor the system to ensure system performance improves over time.

Note that another use of faults detected by this particular embodiment of the present invention is for a third embodiment of the present invention to use these results to perform fault mitigation activities.

Although pre-generated ML models were assumed for the example detailed above, this particular embodiment can include the present invention's ML model training capability or can utilize re-generated ML models updated by ground operators. To utilize either of these options for this particular embodiment of the present invention, at FIG. 25.07 system operators use the graphical user interface (GUI) shown in FIG. 26 to select "inputs" and "targets" from the live satellite data that the operator wants the present invention's ML models to process for re-training. These configuration updates or newly generated ML models can be sent to the present invention while operating as part of the target system. Targets are selected for items of interest, in this case, control system performance in terms of torque resulting from an RCS jet firing is selected. To select inputs, the developer selects inputs that are directly related to the target under study. In this case, force from RCS jet firings is selected as well as RCS jet on/off times.

Automated Fault Mitigation

In one illustrative embodiment of the invention, automated, low-code fault detection offers a substantial improvement over traditional fault detection systems. However, simply detecting a fault without generating a corresponding recovery resolution limits the autonomy of the target system. The present invention overcomes this hurdle by utilizing inverse neural networks of the prediction model. When a fault is detected, the system software computes potential solutions (also referred to herein as software and hardware fault resolutions) to achieve the expected target system behavior by generating modified input values that serve as the fault resolution. This automatic fault resolution capability significantly increases the autonomy of the target spacecraft system by enhancing onboard fault prediction, resolution, estimation, and response—ultimately enabling the system to safely and efficiently handle unexpected events.

Previous fault mitigation approaches typically required a priori knowledge of every possible fault, relying heavily on pre-defined mitigation strategies. In such systems, once a faulted component was identified, operators would isolate or shut it down and follow a predetermined course of action. This inherently restricts the number of potential recovery solutions and demands extensive manual effort to design mitigations for each known fault scenario. In contrast, the present invention generates fault mitigation solutions automatically and dynamically, without relying solely on pre-defined strategies. System operators are thus freed from the need to anticipate every possible fault, as the invention delivers mitigation solutions that are tailored to the specific, real-time fault encountered. By immediately identifying the root causes of faults and generating mitigation solutions specific to the encountered issues, the invention dramatically improves operational efficiency and responsiveness.

Figure 27:
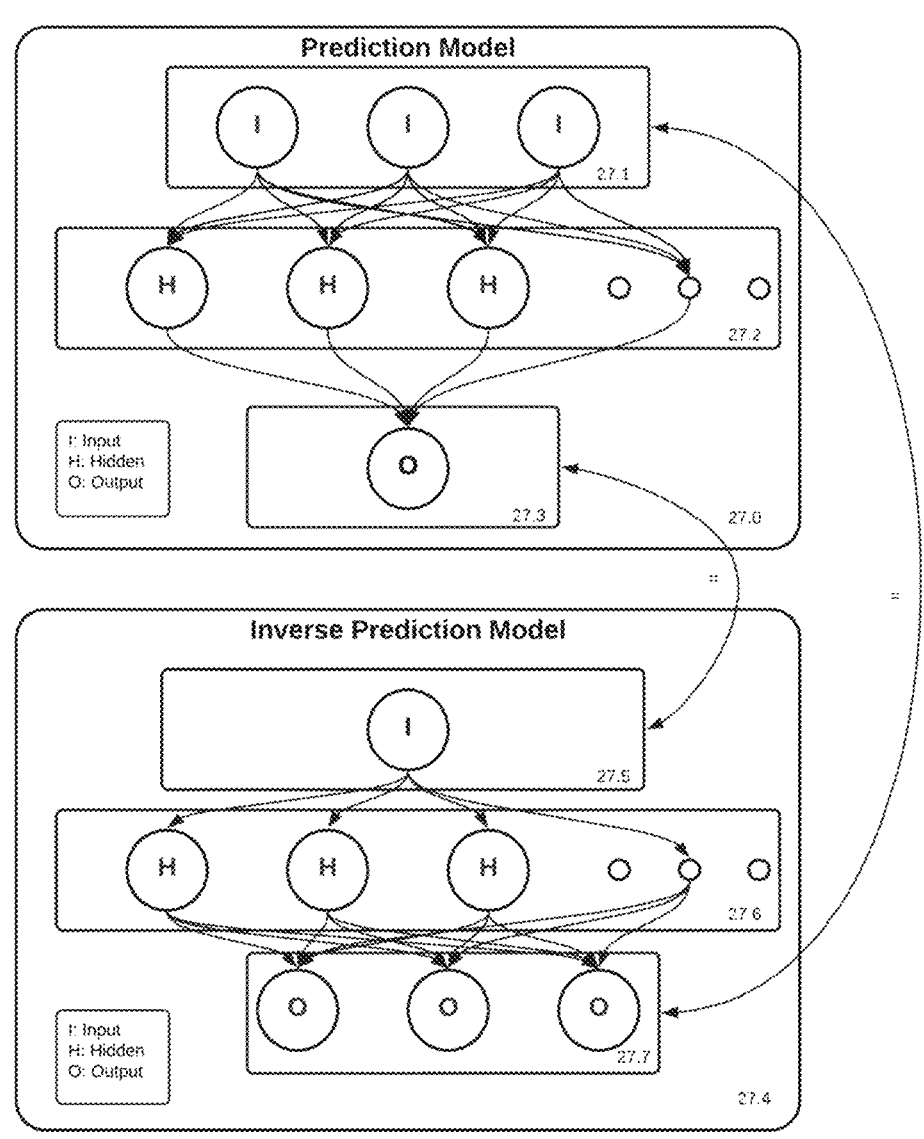
FIG. 27 is a depiction of the inverted prediction model utilized to predict inputs from the prediction ML model's output in which a given output from the prediction model is fed into the inverse prediction model, in nominal cases, should result in the output if the inverse model equating to that of the inputs of the prediction model.

The present invention accomplishes fault identification by employing an inverse neural network of the prediction model (see FIG. 27.4). This inverse model (FIG. 27.4) is trained for nominal cases to predict the inputs (FIGS. 27.7 and 27.1) that would produce a given output (FIG. 27.3) in the prediction model. More concretely, the input layer of the inverse model (FIG. 27.5) corresponds to the prediction model's output layer (FIG. 27.3), and the output layer of the inverse model (FIG. 27.7) corresponds to the prediction model's input layer (FIG. 27.1). When processed with nominal data, the output of the prediction model (FIG. 27.3) could be fed as the input (FIG. 27.5) for the inverse model so that the output (FIG. 27.7) of the inverse model would equate the inputs of the prediction model (FIG. 27.1). Training for this input prediction model can occur in parallel with the training of the classifier model by observing how the prediction model behaves under various conditions. This specifically provides value by solving for the unknown variable in a faulted case which, in this case, a set of nominal inputs required to generate the desired nominal behavior matching the observed behavior.

To give an example of the inverse prediction model, imagine a prediction model with 100 inputs and 1 output. The prediction model may be a neural network that would contain 100 input nodes, 2 hidden layers with 10000 and 1000 neurons respectively, and an output size of 1. The inverse model could be a neural network that is an exact inverse of the above prediction model, thus having 1 input node, 2 hidden layers with 1000 and 10000 neurons respectively, and an output layer of size 100. In nominal cases, a set of 100 data values can be passed to the prediction model outputting a prediction value of 2.34. Using this output value, 2.34, as the input for the inverse model, the output of the model should equate the 100 values passed to the prediction model.

Turning to FIG. 28, when a fault occurs (FIG. 28.1), the invention calculates the delta between the expected inputs (FIG. 28.16) generated by the inverse model and the actual observed system inputs (FIG. 28.12). By analyzing this delta, the invention identifies which source inputs caused the fault. Once the cause is determined, the invention can employ algorithms—either machine learning-based or manually coded—to adjust system inputs accordingly (FIG. 28.18). This process involves several steps:

Generating Expected Inputs: Pass the observed behavior of the targets (FIG. 28.12) through the inverse model (FIG. 28.15) to find a new set of input values (FIG. 28.16) that should yield the desired system outcome.

Resolve Observed Inputs: Pass the generated expected inputs along with observed inputs and behaviors (FIG.

28.17) to an input resolution algorithm (FIG. 28.18) to find a valid delta for inputs to return to nominal behavior.

Adjusting Predicted Behavior: Start with the predicted behavior (FIG. 28.21) based on the generated input resolution (FIG. 28.19) and apply the delta observed in the real system behavior to it (FIG. 28.22).

Validating Through the Prediction Model: Feed these new input values (FIG. 28.19) back into the prediction model (FIG. 28.20) and classifier model (FIG. 28.24) to ensure that the resulting system behavior now aligns with expectations (FIG. 28.25).

Iterative Refinement: If the behavior does not match expectations (FIG. 28.25), return to the beginning of the fault resolution control loop (FIG. 28.15) injecting the newer behavior predictions (FIG. 28.21) as an additional input to the inverse prediction model (FIG. 28.15).

This iterative loop is more clearly visualized in FIG. 29 where it continues until the system identifies and converges on an effective fault mitigation strategy that can be used as long as the fault persists. Once the fault resolves (FIG. 29.09)—an event the model can detect within a single software frame after the fault's removal—the system reverts to its normal, non-faulted state, thereby conserving computer resources and improving performance.

Example Scenario

Consider a spacecraft equipped with 16 Reaction Control System (RCS) thrusters and one main engine (FIG. 30). The system operators want to maneuver the spacecraft into a new orbit and thus transmits a thruster firing plan (FIG. 30.0) to achieve this. During execution, one RCS thruster fails and is determined to be a fault (FIG. 30.4). In conventional systems, such a fault might halt the firing plan entirely while operators diagnose the fault and devise a mitigation strategy. This delay can be critical, potentially compromising the mission or even endangering the spacecraft.

With the present invention, the root cause of the failed thruster is immediately determined. The system automatically generates fault-specific mitigation actions (FIG. 30.5) and can implement them onboard (FIG. 30.5) without waiting for human intervention. As a result, mission continuity is maintained, risk is minimized, and the spacecraft can dynamically adapt to and overcome unexpected faults.

FIG. 31 is a depiction of an example in which the present invention's AI model is generated (FIG. 31.3) and tested (FIG. 31.4) by ground teams, deployed (FIG. 31.6) on a target satellite system (FIG. 31.7) and executed on the satellite system (FIG. 31.10). During execution of the satellite system (FIG. 31.9), the satellite telemetry (FIG. 31.8) is passed into the present invention's AI model (FIG. 31.10) which determines if a fault has occurred (FIG. 31.11). If a fault is detected, the model generates a mitigation solution (FIG. 31.12).

System Behavior Simulation

In one embodiment, the present invention enables its generated AI models to be leveraged for system behavior simulation. These simulation models are generated based on observed behavior of individual components or entire systems, and the source data can derive from a variety of origins: closed-source simulation outputs, hardware-in-the-loop (HIL) testbeds, or telemetry and system data gathered from operational deployments (see FIG. 34 and FIG. 35).

For example, looking at FIG. 34, you can observe system data FIG. 34.1 (containing both the input data consumed by the system component as well as the behavior data of the system component being modeled) is used to generate a model in FIG. 34.4. When new data is passed through that model, the model's predicted behavior data (FIG. 34.5) matches the components behavior from FIG. 34.2 by observing the plot in FIG. 34.6.

By offering a low-code or no-code simulation solution, the present invention provides a highly cost-effective method of simulating complex hardware solely through observation. Unlike traditional simulation models, which often rely on manual coding or potentially inaccurate documentation, the observation-based models described herein can reflect real-world system behavior more accurately. This reduces the risk of errors stemming from outdated or imprecise component specifications, producing more realistic simulations and improving the fidelity and reliability of downstream analysis.

An additional advantage lies in the system's inherent flexibility. Hardware specifications and system configurations often change over the course of a project. Engineers frequently find themselves needing to adjust simulation models to reflect new hardware components or updated performance parameters. With the present invention, when system specifications evolve—such as the introduction of a new hardware module—an updated simulation model can be quickly generated from newly observed data. This eliminates the need for extensive recoding or re-validation of traditional simulation models, thereby streamlining the development cycle. Both hardware and software teams benefit: hardware teams can iterate on their designs with immediate simulation support, and software teams can continue their development uninterrupted, as accurate simulation models are readily available.

Turning to FIG. 35, consider a robot with a motor controller (FIG. 35.6) responsible for regulating motor rotation rates (FIG. 35.4) and monitoring power consumption (FIG. 35.3). Hardware engineers test an initial motor controller to confirm its compatibility and performance prior to building a prototype. All observed test data (FIG. 35.5)—such as input commands, output signals, and corresponding power usage—are fed into the present invention. From these observations, an AI-generated simulation model (FIG. 35.7) is created that accurately represents the motor controller's behavior.

Now, imagine that six months later, the team discovers a more cost-effective motor controller that exhibits slightly different performance characteristics. After validating this new controller's hardware performance, the hardware team provides fresh observational data to the present invention. A new simulation model is generated almost instantly without requiring extensive manual coding or re-architecting the simulation environment. The software team can immediately integrate this updated simulation model into their development pipeline, enabling them to adapt their code to the new hardware parameters seamlessly. The new model can also be subjected to existing system tests to probe the motor controller's capabilities further, facilitating more informed decision-making regarding hardware upgrades.

In this way, the present invention's simulation capabilities minimize development delays, reduce errors caused by inaccurate documentation, and provide a continuously adaptable simulation environment. This dynamic, data-backed approach ensures that engineers always have up-to-date and reliable simulation models, even in the face of evolving system specifications and performance goals.

Definitions

As discussed herein, the following terms and definitions apply:

Telemetry: data values packaged for the purposes of communication throughout a system and/or from a system to another location. Typically, for complex systems, telemetry is a subset of all data created, consumed, calculated within a system. This subset is selected to ensure required data is communicated as necessary while still "fitting" within the bandwidth constraints of a system. In the case of the present invention, telemetry is one type of data the invention may consume and process for the purpose of generating predictions. Telemetry may be consumed by the invention "live," as a system is operating, or via logged telemetry that is stored.

Internal System Data: data produced and consumed and used for calculations within a system that is not packaged as a part of telemetry. In the case of the present invention, internal system data is one type of data the invention may consume and process for the purpose of generating predictions. Internal system data may be consumed by the invention "live," as a system is operating, or via logged internal system data that is stored.

Software Test Data: Data produced during software testing including but not limited to, flight software (FSW) data and simulation data. In the case of the present invention, software test data is one type of data the invention may consume and process for the purpose of generating predictions. System test data may be consumed by the invention "live," as a system is operating, however it is typically processed after a test event via logged software test data that is stored.

System Test Data: Data produced during system testing including but not limited to, hardware parameter values, FSW data, and simulation data. In the case of the present invention, System test data is one type of data the invention may consume and process for the purpose of generating predictions. System test data may be consumed by the invention "live," as a system is operating, however it is typically processed after a test event via logged system test data that is stored.

System Behavior Data: A broad term used to define all data related to a system including but not limited to, telemetry, internal system data, or logged test data. In the case of the present invention, system behavior data is one type of data the invention may consume and process for the purpose of generating predictions. System test data may be consumed by the invention "live," as a system is operating, however it is typically processed after a test event via logged system test data that is stored.

Target: A parameter a user desires the present invention to predict.

Input: A parameter related to the target that is used to predict the target. There may be multiple inputs for a given target.

Frame: A set of parameters with the same timestep. A frame of data represents the value of that parameter at a given time step.

Prediction: The value the present invention anticipates for a target based on designated inputs Anomaly: A prediction which significantly differs from the system behavior data by more than a designated threshold.

Fault: An anomaly or set of anomalies that occur on a running system indicating a failure of a system component which could indicate a degraded system or lead to system failure if not mitigated. All faults are anomalies, not all anomalies are faults.

Online Learning: An approach where an ML or AI model is incrementally updated as new data becomes available allowing them to adapt to new environments over time.

The present invention provides a system and method for an automated system for generating AI models in which system behaviors are predicted and anomalous behavior is classified as a singular unit without requiring extra computer instructions from users. For example, using the present invention in current monitoring on an AC electric motor, 220 volts is applied to the motor and speed increases as frequency is increased. Instead of writing instructions that will calculate out behavior at set frequency intervals, users just run the motor through all the frequencies and log the speed data. That speed, frequency, and voltage data is fed into the present invention where the system and method learn by observation how the motor will react to a given frequency or voltage change without the need for writing manual instructions. If the speed did not match expected performance, whether spinning too slowly or too fast due to change in friction, the system and method uses an ML model which detects and flags a fault. This removes the concern of arbitrary thresholds being used and guarantees a data backed decision being made.

In another illustrative example of the present invention, the model is used for automated fault detection by ingesting real-time data from the system and outputting a fault state. For example, consider the output from the example above. The ML models generated are used to generate a prediction of performance, a differential algorithm would then determine the difference between reality and the predicted behavior, and the classifier ML model generates output whether or not a given point in time the real behavior is nominal or anomalous. For example, when the wheel has 1000 hertz applied, the ML model may predict that the wheel should be spinning at 500 rpm, but when someone applies friction to the wheel, it only spins at 250 rpm. The fault detection system would detect this difference and notify users that a fault has occurred.

In another example of the invention, the system and method further include but is not limited to a method for fault mitigation, wherein the system uses inverse neural network methodologies to identify root causes of detected faults and autonomously generates recovery actions specific to the detected fault, thereby enhancing operational safety and system autonomy.

For example, you can consider the example from claim 1 where friction is applied to a motor, thus slowing down motor speed. The present invention model is able to take this information, find the delta between expected performance and observed performance, determine what the expected inputs would be (this case frequency applied to the motor) for the given behavior, and determine the expected delta frequency that must be applied to reach desired performance. This is valuable as users do not need to manually write instructions for defining mitigation strategies which can get exponentially more complex as target systems become more complex.

In an illustrative embodiment of the invention, a system and a method for automated AI model generation are provided in which system behaviors are predicted and anomalous behaviors are classified without requiring extra computer instructions from users, wherein the model is used for automated fault detection by processing real-time data from the system and outputting a fault state. The invention further includes but is not limited to a method for fault mitigation, wherein the system uses inverse neural networks to identify root causes of detected faults and automatically generates recovery actions specific to the detected fault, thereby enhancing operational safety and system autonomy without human intervention.

An illustrative embodiment of the invention includes but is not limited to a non-transitory computer readable medium containing computer executable instructions; a processor that executes the computer executable instructions stored in the non-transitory computer readable medium; an automated fault detection software module; a target system, wherein the automated fault detection software module is embedded in the target system and configured to detect faults and generate resolutions in the target system; a computer program stored in the non-transitory computer readable medium, the computer program comprising computer executable instructions, the computer program comprising, instructions to implement a configuration command to automatically configure a fault prediction model neural network, wherein the fault prediction model neural network is configured based on configuration parameter; instructions to predict faults in the target system using the fault prediction model; instructions to generate a resolution for the predicted fault; and instruction to resolve the fault in the target system.

In an illustrative embodiment of the invention includes but is not limited to instructions to process actual output data values from the target system; a prediction model, wherein the prediction model is a neural network; a classifier model, wherein the classifier model is a neural network.

In an illustrative embodiment of the invention includes but is not limited to computer readable instructions train the prediction model on system behavior data sets; computer readable instructions to generate system behavior prediction data sets based on the prediction model; to compare predicted output data values from the prediction model to output data values from the target system; and instructions to generate deltas between the predicted output data values from the target system to the actual output data values from the target system; instructions to identify nominal output data values based on the deltas between the predicted output data values from the target system to the output data values from the target system; instructions to identify anomalous output data values based on the delta between the predicted output data values from the target system to the actual output data values from the target system; instructions to automatically label the nominal output data values to generate auto-labeled data values; instructions to automatically label the anomalous output data values; instructions to use the auto-labeled data values are used to automatically update weights of the classifier model, wherein the classifier will give confidence levels of its predictions and instructions to train a classifier model using the anomalous output data values.

In an illustrative embodiment of the invention includes but is not limited to instructions to train the fault prediction model, wherein 100 percent of telemetry data values from the target system is used to train the fault detection model.

In an illustrative embodiment of the invention includes but is not limited to instructions to label at least, one data value at random as an outlier when no outlier data is detected with an outlier detection algorithm; to be used when training a classifier model.

In an illustrative embodiment of the invention includes but is not limited to instructions to use when a fault is detected; instructions to work through the prediction model to determine expected inputs from observed behavior data; instructions to calculate a delta between observed behavioral data and inputs required to reproduce the observed behavior data; instructions to pass modified inputs through the fault detection model to check for a fault; instructions to automatically generate and communicate mitigation inputs to the target system for a mitigation solution.

In an illustrative embodiment of the invention includes but is not limited to controls for users to update existing AI models, iterating its capability by applying new data for the model to be trained on; and instructions to increment the training on new data on a server; and instructions to increment the training on new data on an edge device.

In an illustrative embodiment of the invention includes but is not limited to user configurable instructions which allow adjustment of incremental training speed.

In an illustrative embodiment of the invention includes but is not limited to a graphical user interface (GUI) for configuring model parameters, wherein the GUI enables non-machine learning experts to select input and target variables for training and operation of the system.

In an illustrative embodiment of the invention includes but is not limited to prediction models and classification models combined to produce more informed and robust fault detection outputs.

In an illustrative embodiment of the invention includes but is not limited to instructions to adjust predicted behavior, instructions to start with original predicted behavior and apply a delta in observed behavior data to the predicted behavior; instructions to generate corrected inputs; instructions to pass the adjusted prediction through an inverse model to find a new set of input values that should yield a desired system outcome; instructions to validate through the prediction model; instructions to feed these new input values back into the prediction model to ensure that the system behavior now matches with expectations; and instructions to perform iterative refinement when a resulting system behavior does not match expectations, comprising instructions to modify the adjusted behavior and repeat until a satisfactory solution is found and a fault is resolved.

In an illustrative embodiment of the invention includes but is not limited to an input layer of the inverse model corresponds to a prediction model's output layer, and the output layer of the inverse model corresponds to the prediction model's input layer.

In an illustrative embodiment of the invention includes but is not limited to generating a simulation of the target system for testing in stress conditions without risk to a target system or testing of possible outcomes against varied inputs, for example in stress conditions without risk.

In an illustrative embodiment of the invention wherein the configuration comprises parameters that shape this model comprise a number of user-defined inputs, number of user-defined targets, complexity of data used for training, and model scaling coefficients, wherein a size of each layer within the model is adjusted according to this configuration data set.

An illustrative embodiment of the invention includes but is not limited to instructions to configure the prediction model to focus on anomaly detection and resolution, by biasing towards lower-fidelity model approaches in behavior prediction, allowing the system to detect faults more efficiently. This typically results in a larger delta of behavior predictions; however, the average delta provides more noise for a classifier model to train with, resulting in minimization of false positives in anomaly detections.

In an illustrative embodiment of the invention wherein an auto-labeling module and neural network for classification creates a dynamic threshold for detecting a fault.

In an illustrative embodiment of the invention includes but is not limited to instructions to determine a fault on satellite with thrusters, wherein system data comprises a row of data from a time frame of execution, wherein each row would include a boolean value for each thruster representing the commanded state of the thruster (on or off), wherein each row would include forces applied to a vehicle for an X, Y, and Z axis, wherein a user configures the prediction model to use columns for thrusters being commanded on as 'inputs' and the X, Y, and Z axis of force values to be targets, wherein inputs are the values that prediction models consume to make a prediction of the 'targets', wherein the targets in telemetry are used to train a prediction ML model, wherein a delta between the predicted 'target' values and the telemetry 'target' values is used to train and feed through a classifier ML model.

The invention claimed is:

1. A method, the method comprising:
(a) automatically generating, on a controller having a processor and memory coupled to a physical target system and its actuators, AI models in which system behaviors are predicted and anomalous behaviors are classified using telemetry at a control loop of at least a system update;
(b) comparing, in real time within the control loop predicted target variables to measured target variables to compute deltas;
(c) processing the deltas through an inverse neural network whose input layer corresponds to outputs of a prediction model and whose output layer corresponds to control inputs of the target system, to identify a root cause and determine mitigation inputs; and
(d) within the control loop, automatically transmitting the mitigation inputs through an actuator interface to the target system under safety constraints, thereby resolving a detected fault without human intervention, and maintaining execution of steps (b)-(d) within a predefined control-loop timing threshold.

2. The method of claim 1, wherein automated fault detection comprises processing telemetry at the control loop to compute deltas and
providing, by a classifier model executed within the control loop, classifier confidence values,
and automatically providing a fault state that performs steps (c) and (d) when the classifier confidence values are over a threshold set by safety constraints.

3. The method of claim 2, wherein the inverse neural network identifies a root cause and computes mitigation inputs that are validated by the prediction model within the control loop, and the mitigation inputs are applied without human intervention and subject to actuator and safety constraints.

4. A system for automated fault detection and resolution, the system comprising:
(i) a non-transitory computer readable medium containing executable instructions;
(ii) a processor that executes the executable instructions;
(iii) an automated fault detection and resolution software module embedded in a target system and configured to detect faults and generate and apply resolutions in the target system;
(iv) a computer program that, when executed, implements:
(1) a configuration command to automatically configure a fault prediction neural network based on configuration parameters including system inputs and targets;
(2) ingestion of telemetry at a control loop and prediction of target variables;

(3) generation of deltas between predicted and measured target variables;

(4) an inverse neural network that applies deltas in target variables to actuator control inputs, and generation of mitigation inputs subject to safety constraints; and (5) automatic application of the mitigation inputs via an actuator interface to resolve the fault in the target system within the control loop.

5. The system of claim 4, wherein the computer program further comprises: instructions to ingest measured target variables at the control loop; a prediction model implemented as a neural network; and a classifier model implemented as a neural network, the prediction model and classifier model executing within a control loop.

6. The system of claim 5, wherein the computer program further comprises: instructions to online train the prediction model using system behavior datasets while maintaining the control loop; instructions to generate predicted datasets and deltas; instructions to identify nominal and anomalous outputs based on the deltas; instructions to auto label nominal and anomalous outputs; and instructions to update classifier weights with the auto labels.

7. The system of claim 4, wherein training of a fault prediction model uses all available telemetry via an online training that adapts to a control loop timing threshold.

8. The system of claim 4, further comprising instructions to label at least one data value as an outlier when an outlier detection algorithm identifies no outliers, the labeling being limited to a threshold number of labels per control loop used to maintain classifier robustness.

9. The system of claim 4, wherein upon detection of a fault the computer program: determines expected inputs from observed behavior by providing deltas through the inverse neural network; computes differences between observed behavior and inputs required to reproduce the behavior; validates mitigation inputs by passing them through a prediction model; and automatically communicates the validated mitigation inputs through an actuator interface to implement a mitigation solution within the control loop.

10. The system of claim 4, further comprising instructions to incrementally train model parameters based on system behavior datasets and deploy updated model parameters within the control loop after a safety validation.

11. The system of claim 10, wherein the incremental training is performed while maintaining execution within the control loop.

12. The system of claim 4, further comprising a graphical user interface configured to enable non-machine learning experts to select inputs and targets, set threshold safety constraints and estimated loop utilization prior to deploying configuration changes to the embedded module.

13. The system of claim 4, wherein outputs of a prediction model and a classifier model are combined that issues mitigation inputs only when predicted deltas greater than a certain behavior thresholds and a classifier confidence is greater than a threshold, thereby reducing false positives.

14. The system of claim 9, wherein the computer program further: adjusts predicted behavior by applying observed behavior deltas; generates corrected inputs via the inverse neural network; validates the corrected inputs via the prediction model; and performs iterative refinement over a threshold number of control loop cycles until a satisfactory outcome is achieved.

15. The system of claim 14, wherein an input layer of the inverse neural network corresponds to an output layer of the prediction model and an output layer of the inverse neural network corresponds to control inputs of the target system, thereby providing model space deltas to actuator space commands.

16. The system of claim 4, further comprising instructions to simulate the target system with actuator constraints as the embedded module, for testing of mitigation performance before field deployment.

17. The system of claim 4, wherein configuration parameters include user defined inputs, targets, training data complexity, and model scaling coefficients, and layer sizes.

18. The system of claim 4, wherein prediction model is biased toward lower fidelity prediction to intentionally generate larger deltas that, when averaged, increase training signal to noise for a classifier neural network and thereby reduce false positives.

19. The system of claim 4, wherein an auto labeling module together with a classifier neural network establishes a dynamic threshold for fault detection based on a weighted estimate of delta statistics computed each control loop cycle.

20. The system of claim 4, wherein the target system comprises a satellite with thrusters, and the computer program: ingests thruster commands and three axis force telemetry at the control loop; configures prediction model inputs as thruster commands and targets as force axis values; computes deltas between predicted and measured force values; and, upon detecting a fault, provides the deltas through the inverse neural network to generate per thruster mitigation commands subject to thruster cycle control safety constraints, and transmits the commands via the actuator interface within the control loop.

\* \* \* \* \*